US009497684B2

(12) United States Patent
Suryavanshi

(10) Patent No.: US 9,497,684 B2
(45) Date of Patent: Nov. 15, 2016

(54) RADIO ACCESS TECHNOLOGY HANDOVER OPTIMIZATION IN A PUSH-TO-TALK SESSION

(71) Applicant: QUALCOMM Incorporated, San Diego, CA (US)

(72) Inventor: Vijay Anandrao Suryavanshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/549,246

(22) Filed: Nov. 20, 2014

(65) Prior Publication Data

US 2016/0150455 A1    May 26, 2016

(51) Int. Cl.
*H04W 36/00* (2009.01)
*H04W 36/24* (2009.01)
*H04W 4/10* (2009.01)
*H04W 76/00* (2009.01)

(52) U.S. Cl.
CPC ............. *H04W 36/245* (2013.01); *H04W 4/10* (2013.01); *H04W 36/24* (2013.01); *H04W 76/005* (2013.01)

(58) Field of Classification Search
CPC .......................... H04Q 7/22; H04W 36/245
See application file for complete search history.

(56) References Cited

U.S. PATENT DOCUMENTS

| 7,397,779 | B2 | 7/2008 | Chandra et al. | |
|---|---|---|---|---|
| 8,588,781 | B2 | 11/2013 | Belschner et al. | |
| 8,675,476 | B2 | 3/2014 | Brownworth et al. | |
| 8,750,250 | B2 | 6/2014 | Milam et al. | |
| 2004/0042438 | A1* | 3/2004 | Jiang et al. | 370/342 |
| 2005/0090228 | A1* | 4/2005 | Black | 455/405 |
| 2006/0088065 | A1* | 4/2006 | Khatter | 370/528 |
| 2006/0116150 | A1* | 6/2006 | Bhutiani | 455/518 |

(Continued)

FOREIGN PATENT DOCUMENTS

| EP | 1795021 A1 | 6/2007 |
|---|---|---|
| EP | 1081969 B1 | 12/2008 |
| WO | 9965266 A1 | 12/1999 |

OTHER PUBLICATIONS

3GPP TR 25.913 V9.0.0 (Dec. 2009), 3rd Generation Partnership Project; Technical Specification Group Radio Access Network; Requirements for Evolved UTRA (E-UTRA) and Evolved UTRAN (E-UTRAN) (Release 9), 2009, 17 Pages.

(Continued)

*Primary Examiner* — Keith Fang
(74) *Attorney, Agent, or Firm* — Muncy, Geissler, Olds & Lowe, P.C.

(57) ABSTRACT

The disclosure relates to handover optimization in a voice communication session or other real-time multimedia session. For example, a wireless device associated with a parent user may detect a condition triggering a handover during a current voice communication session between the parent user and a target user, wherein the handover has a type associated with a switching delay. The wireless device may maintain statistics relating to an average mutual silence duration after talk spurts from the parent user and the target user based on one or more past voice communication sessions in which at least the parent user participated and trigger the handover when a next talk spurt from either the parent user or the target user ends where the average mutual silence duration exceeds the switching delay associated with the handover type.

22 Claims, 20 Drawing Sheets

(56) References Cited

U.S. PATENT DOCUMENTS

2006/0252441 A1* 11/2006 Harris et al. .................. 455/518
2007/0280256 A1* 12/2007 Forslow ..................... 370/395.2

OTHER PUBLICATIONS

3GPP TS 23.401 V13.0.0 (Sep. 2014), 3rd Generation Partnership Project;Technical Specification Group Services and System Aspects;General Packet Radio Service (GPRS) enhancements for Evolved Universal Terrestrial Radio Access Network (E-UTRAN) access (Release 13), 2014, pp. 1-305.
Open Mobile Alliance: "Push to talk over Cellular (PoC)—Architecture", OMA-AD_PoC-V1_0-20060127-C, Candidate Version 1.0—Jan. 27, 2006, 158 Pages.
International Search Report and Written Opinion—PCT/US2015/057388—ISA/EPO—Feb. 5, 2016.

* cited by examiner

RADIO ACCESS TECHNOLOGY HANDOVER OPTIMIZATION IN A PUSH-TO-TALK SESSION

TECHNICAL FIELD

The disclosure relates to wireless group communications, and in particular, to radio access technology (RAT) handover optimization in a push-to-talk (PTT) session.

BACKGROUND

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as Enhanced Data rates for GSM Evolution (EDGE) and Universal Mobile Telecommunications System (UMTS) protocols such as High-Speed Packet Access (HSPA).

Accordingly, communications systems and devices are becoming increasingly diverse with new technological advancements. Communications devices are now able to support various different communications technologies and protocols. For example, a wireless telecommunication service generically referred to as "Push-To-Talk" (PTT) capability can provide quick one-to-one or one-to-many communications, wherein a carrier typically establishes the recipient devices for wireless device communicating in a PTT group. For example, a PTT communication connection may typically be initiated in response to a single button-push on a wireless device, which may activate a half-duplex link between the speaker and each member device within the group, wherein the device can subsequently receive incoming PTT transmissions once the button is released. In some arrangements, the PTT speaker will have the "floor" whereby no other group member can speak while the speaker holds the floor. Accordingly, once the speaker holding the floor releases the PTT button, any other individual member within the group can engage a PTT button in order to request and thereby take the floor. Furthermore, other wireless communication services may support full-duplex Voice-over-Internet Protocol (VoIP) sessions, where communication may be allowed in both directions such that different parties can communicate simultaneously (i.e., parties on different ends can speak and be heard at the same time).

However, various conditions may result in a user involved in a half-duplex or full-duplex voice call needing to trigger a handover from a current base station to a target base station in the same access network or a different access network (e.g., user mobility, radio conditions, cell capacity, more favorable conditions in a neighbor cell, etc.). In the former case, because the current base station and the target base station are in the same access network and therefore implement the same radio access technology (RAT), the handover may be termed an "intra-RAT" handover. In the latter case, the base stations in different access networks may implement different RATs, in which case the handover may be termed an "inter-RAT" handover. However, in cases where the current and target base stations are in different access networks but implement the same RAT, the handover would also be an intra-RAT handover. In any case, if a wireless device is involved in a half-duplex or full-duplex voice call and a handover is triggered, the voice call may end if the handover delay results in inactivity leading to a dropped call and/or perceivable "clicks" due to packet loss and/or delays during the handover may result. Accordingly, depending on the target access network, handovers that are triggered while a wireless device is involved in a voice call or other real-time multimedia session may cause session interruption, packet delay, packet loss, and degraded user experience, among other problems.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

According to various aspects, a method for optimizing handover during voice sessions may comprise detecting a condition triggering a handover at a wireless device associated with a parent user during a current voice communication session between the parent user and a target user, wherein the handover has a type associated with a switching delay, determining an average mutual silence duration after talk spurts from the parent user and the target user based on one or more past voice communication sessions in which at least the parent user participated, and triggering the handover when a next talk spurt from either the parent user or the target user ends in response to the determined average mutual silence duration exceeding the switching delay associated with the handover type.

According to various aspects, a wireless device may comprise a storage device configured to store statistics associated with one or more past voice communication sessions in which at least a parent user associated with the wireless device participated and one or more processors configured to detect a condition triggering a handover during a current voice communication session between the parent user and a target user, determine, from the stored statistics, an average mutual silence duration after talk spurts from the parent user and the target user based on one or more past voice communication sessions in which at least the parent user participated, and trigger the handover when a next talk spurt from either the parent user or the target user ends in response to the determined average mutual silence duration exceeding a switching delay associated with a type that corresponds to the triggered handover.

According to various aspects, a wireless device may comprise means for detecting a condition triggering a handover during a current voice communication session between a parent user associated with the wireless device and a target user, wherein the handover has a type associated with a switching delay, means for determining an average mutual silence duration after talk spurts from the parent user and the target user based on one or more past voice communication sessions in which at least the parent user participated, and means for triggering the handover when a next talk spurt from either the parent user or the target user ends in response to the determined average mutual silence duration exceeding the switching delay associated with the handover type.

According to various aspects, a computer-readable storage medium may have computer-executable instructions recorded thereon, wherein executing the computer-executable instructions on a wireless device may cause the wireless device to detect a condition triggering a handover during a current voice communication session between a parent user associated with the wireless device and a target user, wherein the handover has a type associated with a switching delay, determine an average mutual silence duration after talk spurts from the parent user and the target user based on one or more past voice communication sessions in which at least the parent user participated, and trigger the handover when a next talk spurt from either the parent user or the target user ends in response to the determined average mutual silence duration exceeding the switching delay associated with the handover type.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects disclosed herein and many attendant advantages thereof will be readily obtained as the same becomes better understood through reference to the following detailed description when considered in connection with the accompanying drawings, which are presented solely for illustration purposes and not to limit the disclosure, and in which.

DETAILED DESCRIPTION

Figure 1:
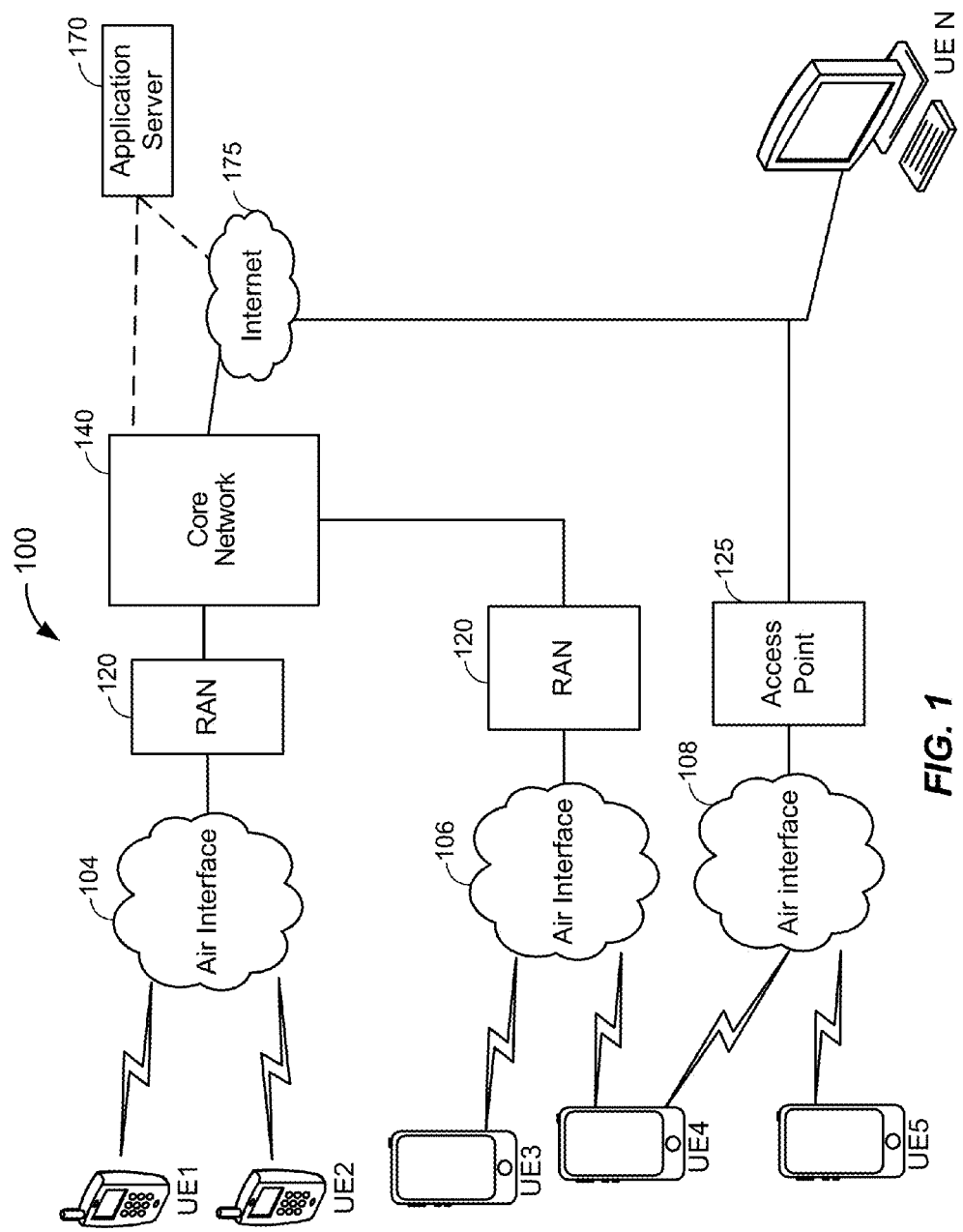
FIG. 1 illustrates a high-level system architecture of a wireless communications system, according to one aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation. Furthermore, the terms "group communication," "push-to-talk" (or "PTT"), or other similar variants as used herein are meant to generally refer to a server arbitrated service between two or more devices.

The terminology used herein is for the purpose of describing particular aspects only and is not intended to limit any aspects and/or embodiments disclosed herein. As used herein, the singular forms "a", "an" and "the" are intended to include plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms actions to be performed by, for example, elements of a computing device. It will be recognized that various actions described herein can be performed by specific circuits (e.g., an application specific integrated circuit (ASIC) or another suitable circuit), by program instructions being executed by one or more processors, or combinations thereof. Additionally, the actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In this description, the terms "client device," "user equipment" (or "UE"), "user terminal," "communication device," "wireless device," "wireless communications device," "push-to-talk communication device" (or "PTT communication device"), "handheld device," "mobile device," "mobile terminal," "mobile station," "handset," "access terminal," "subscriber device," "subscriber terminal," "subscriber station," "terminal," and variants thereof are used interchangeably to refer to any suitable mobile or stationary device that may communicate with a radio access network (RAN) that may implement a particular radio access technology (RAT). The terms "call" and "communication" are also used interchangeably herein, and the term "application" as used herein is intended to encompass executable and non-executable software files, raw data, aggregated data, patches, and other code segments.

In various embodiments, client devices can communicate with a core network via the RAN, and through the core network the client devices can be connected with external networks such as the Internet. Of course, other mechanisms of connecting to the core network and/or the Internet are also possible for the client devices, such as over wired access networks, Wi-Fi networks (e.g., based on IEEE 802.11, etc.) and so on. Client devices can be embodied by any of a number of types of devices including but not limited to PC cards, compact flash devices, external or internal modems, wireless or wireline phones, and so on. A communication link through which client devices can send signals to the RAN is called an uplink channel (e.g., a reverse traffic channel, a reverse control channel, an access channel, etc.). A communication link through which the RAN can send signals to client devices is called a downlink or forward link channel (e.g., a paging channel, a control channel, a broadcast channel, a forward traffic channel, etc.). As used herein the term traffic channel (TCH) can refer to either an uplink/reverse traffic channel or a downlink/forward traffic channel.

The techniques described herein to optimize RAT handover in a PTT session may be used in various cellular communication systems such as Code Division Multiple Access (CDMA), Time Division Multiple Access (TDMA), Frequency Division Multiple Access (FDMA), Orthogonal FDMA (OFDMA), and Single-Carrier FDMA (SC-FDMA) systems. The terms "system" and "network" are often used interchangeably. A CDMA system may implement a radio technology such as Universal Terrestrial Radio Access (UTRA), CDMA2000, etc. UTRA includes Wideband CDMA (WCDMA) and other variants of CDMA. CDMA2000covers IS-2000, IS-95 and IS-856 standards. A TDMA system may implement a RAT such as Global System for Mobile Communications (GSM). An OFDMA system may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink UTRA. E-UTRA, UMTS, LTE, and GSM are described in documents from an organization named "3rd Generation Partnership Project" (3GPP). CDMA2000 and UMB are described in documents from an organization named "3rd Generation Partnership Project 2" (3GPP2). For clarity, certain aspects of the techniques are described below for LTE, and LTE terminology is used in much of the description below.

According to various embodiments, FIG. 1 illustrates a high-level system architecture of a wireless communications system 100 that contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services for UEs that can connect to the application server 170 via the core network 140 and/or the Internet 175 (e.g., Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
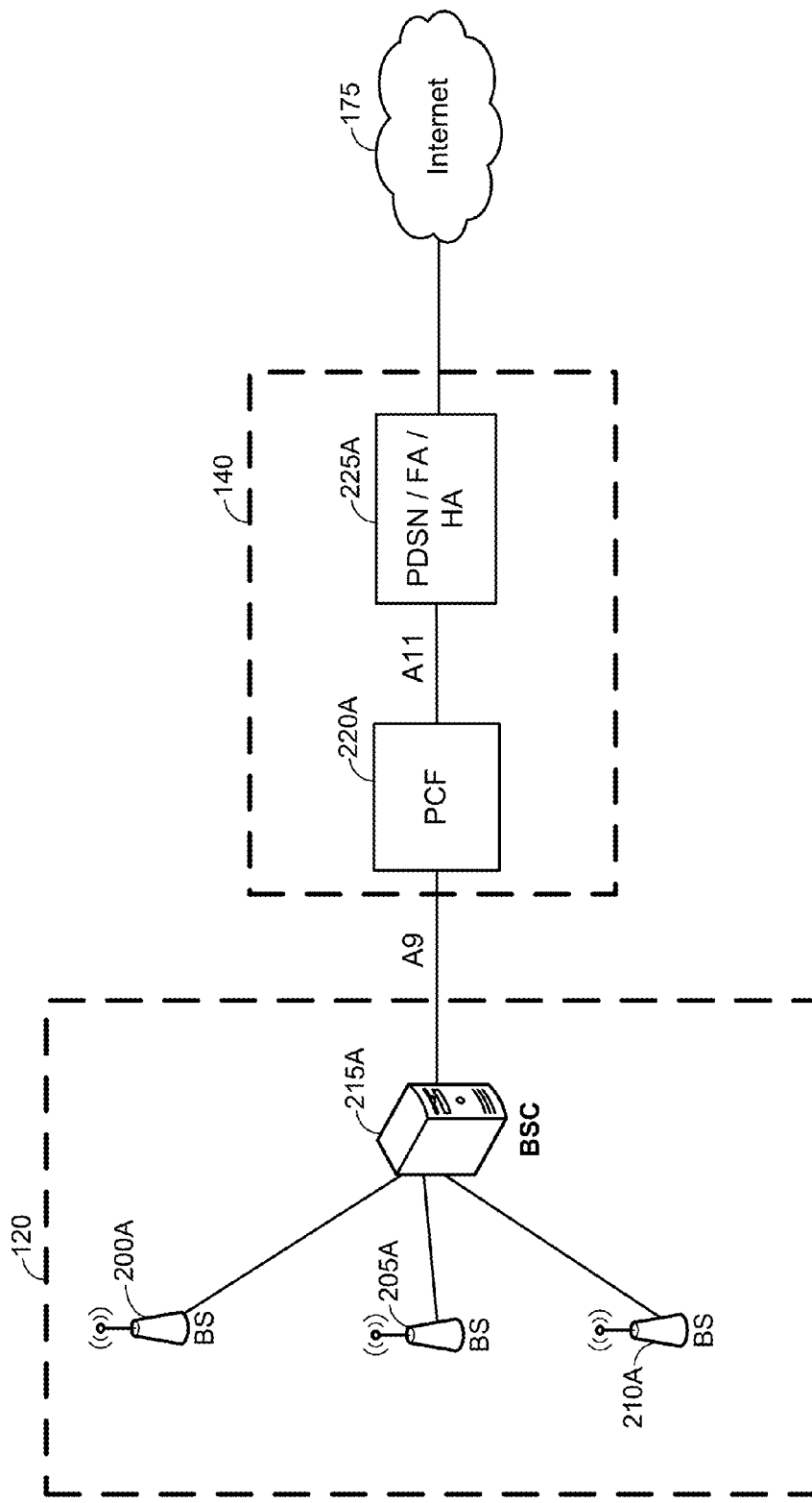
FIG. 2A illustrates an example configuration of a radio access network (RAN) and a packet-switched portion of a core network for a 1x EV-DO network, according to one aspect of the disclosure.

FIG. 2A illustrates an example configuration of the RAN 120 and the core network 140 for packet-switched communications in a CDMA2000 1x Evolution-Data Optimized (EV-DO) network according to one aspect of the disclosure. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
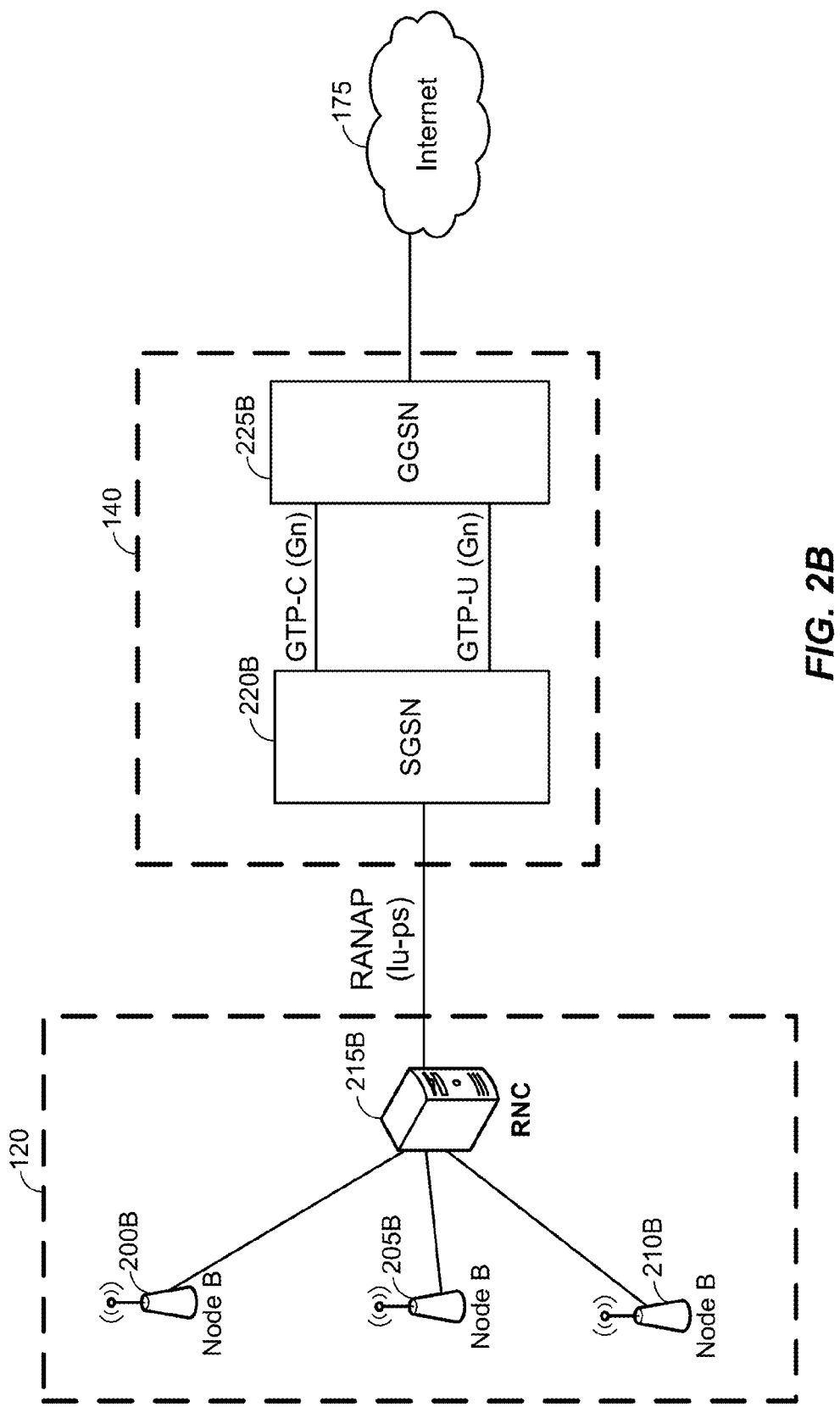
FIG. 2B illustrates an example configuration of the RAN and a packet-switched portion of a General Packet Radio Service (GPRS) core network within a 3G UMTS W-CDMA system, according to one aspect of the disclosure.

FIG. 2B illustrates an example configuration of the RAN 120 and a packet-switched portion of the core network 140 that is configured as a GPRS core network within a 3G UMTS W-CDMA system according to one aspect of the disclosure. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management, and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reachability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB)

of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over an Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
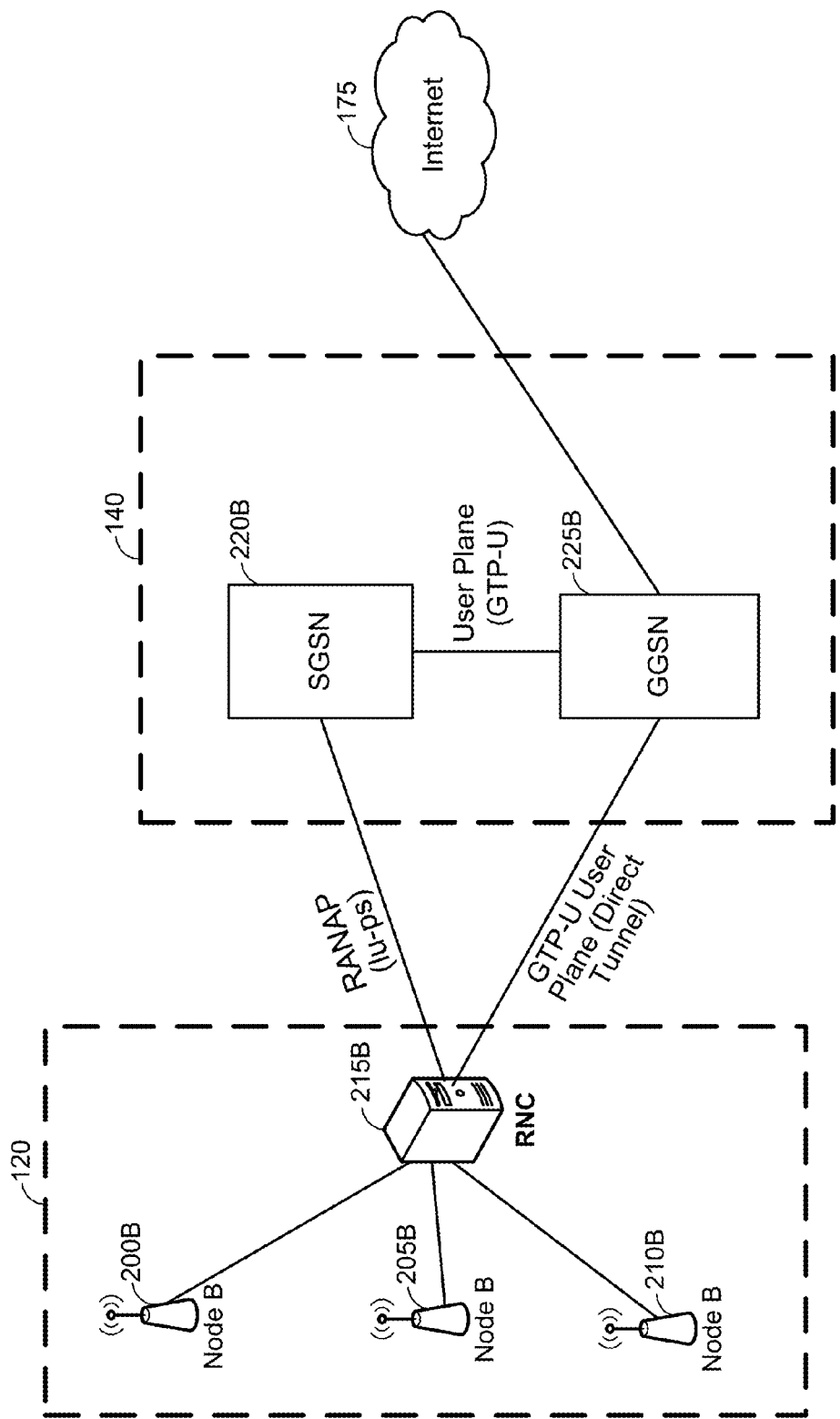
FIG. 2C illustrates another example configuration of the RAN and a packet-switched portion of a GPRS core network within a 3G UMTS W-CDMA system, according to one aspect of the disclosure.

FIG. 2C illustrates another example configuration of the RAN 120 and a packet-switched portion of the core network 140 that is configured as a GPRS core network within a 3G UMTS W-CDMA system according to one aspect of the disclosure. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
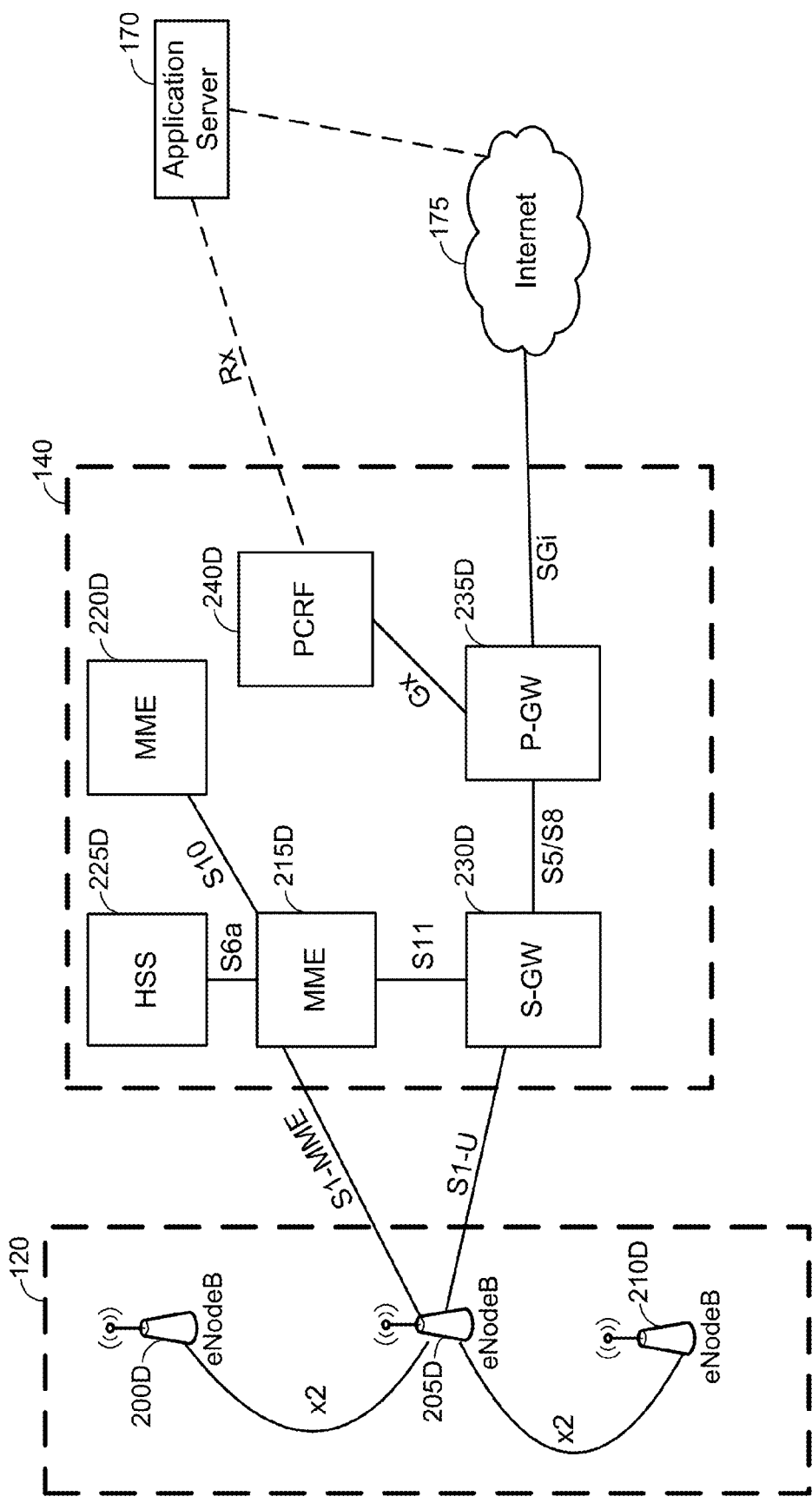
FIG. 2D illustrates an example configuration of the RAN and a packet-switched portion of the core network that is based on an Evolved Packet System (EPS) or Long Term Evolution (LTE) network, according to one aspect of the disclosure.

FIG. 2D illustrates an example configuration of the RAN 120 and a packet-switched portion of the core network 140 based on an Evolved Packet System (EPS) or LTE network, according to one aspect of the disclosure. Referring to FIG. 2D, unlike the RAN 120 shown in FIGS. 2B-2C, the RAN 120 in the EPS/LTE network is configured with a plurality of eNodeBs 200D, 205D and 210D, without the RNC 215B from FIGS. 2B-2C. This is because eNodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120, and the Internet 175 are illustrated in FIG. 2D and further explained below in Table 1.

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per beare ruser plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may bean operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network subsystem. The AF uses the Rx reference point to provide session information to the PCRF 240D. Any other application server offering IP data services over cellular network can also be connected to the PCRF 240D via the Rx reference point.

Figure 2E:
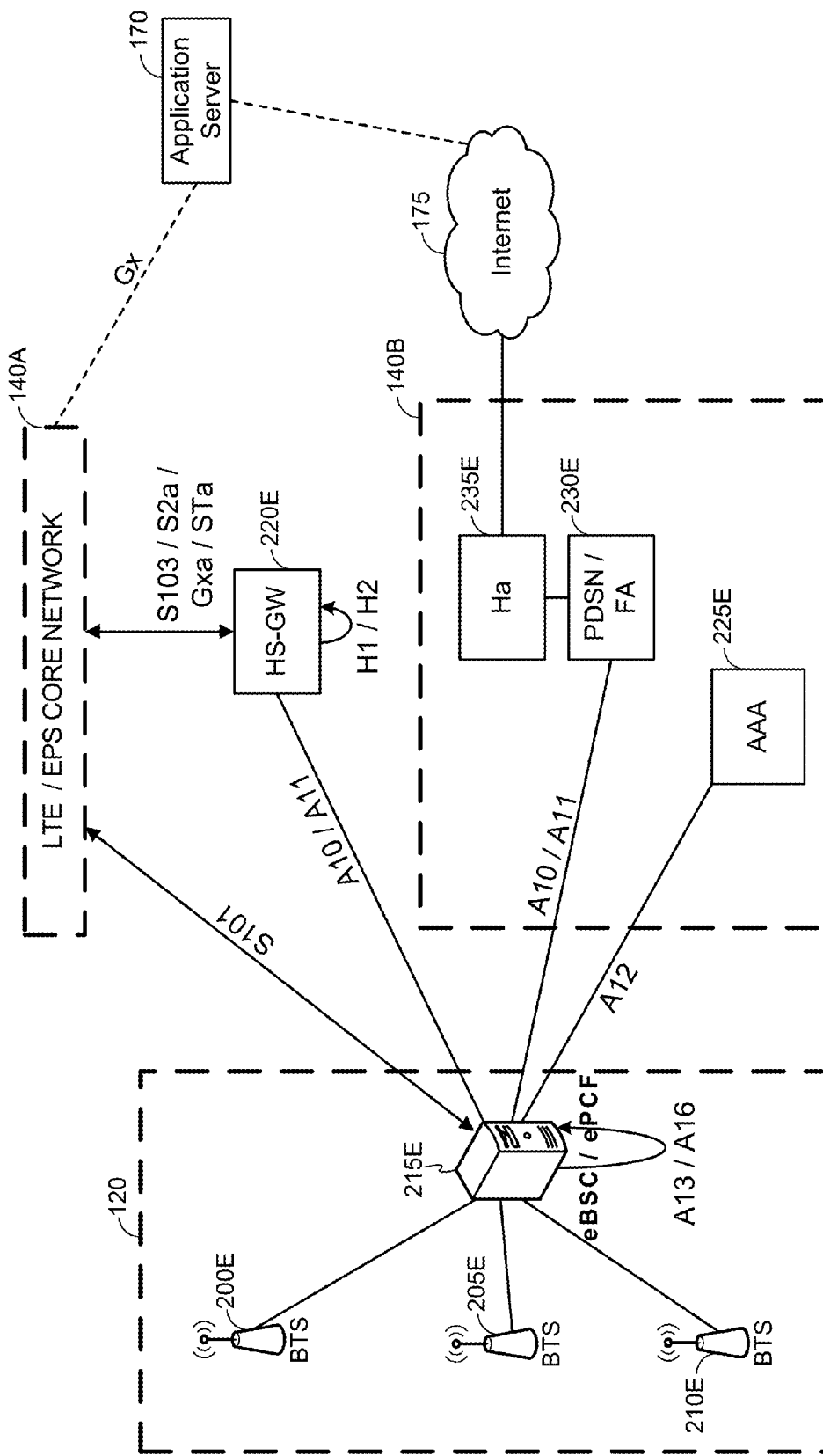
FIG. 2E illustrates an example configuration of an enhanced High Rate Packet Data (HRPD) RAN connected to an EPS or LTE network and also a packet-switched portion of an HRPD core network, according to one aspect of the disclosure.

FIG. 2E illustrates an example of the RAN 120 configured as an enhanced High Rate Packet Data (HRPD) RAN connected to an EPS or LTE network 140A and also a packet-switched portion of an HRPD core network 140B according to one aspect of the disclosure. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
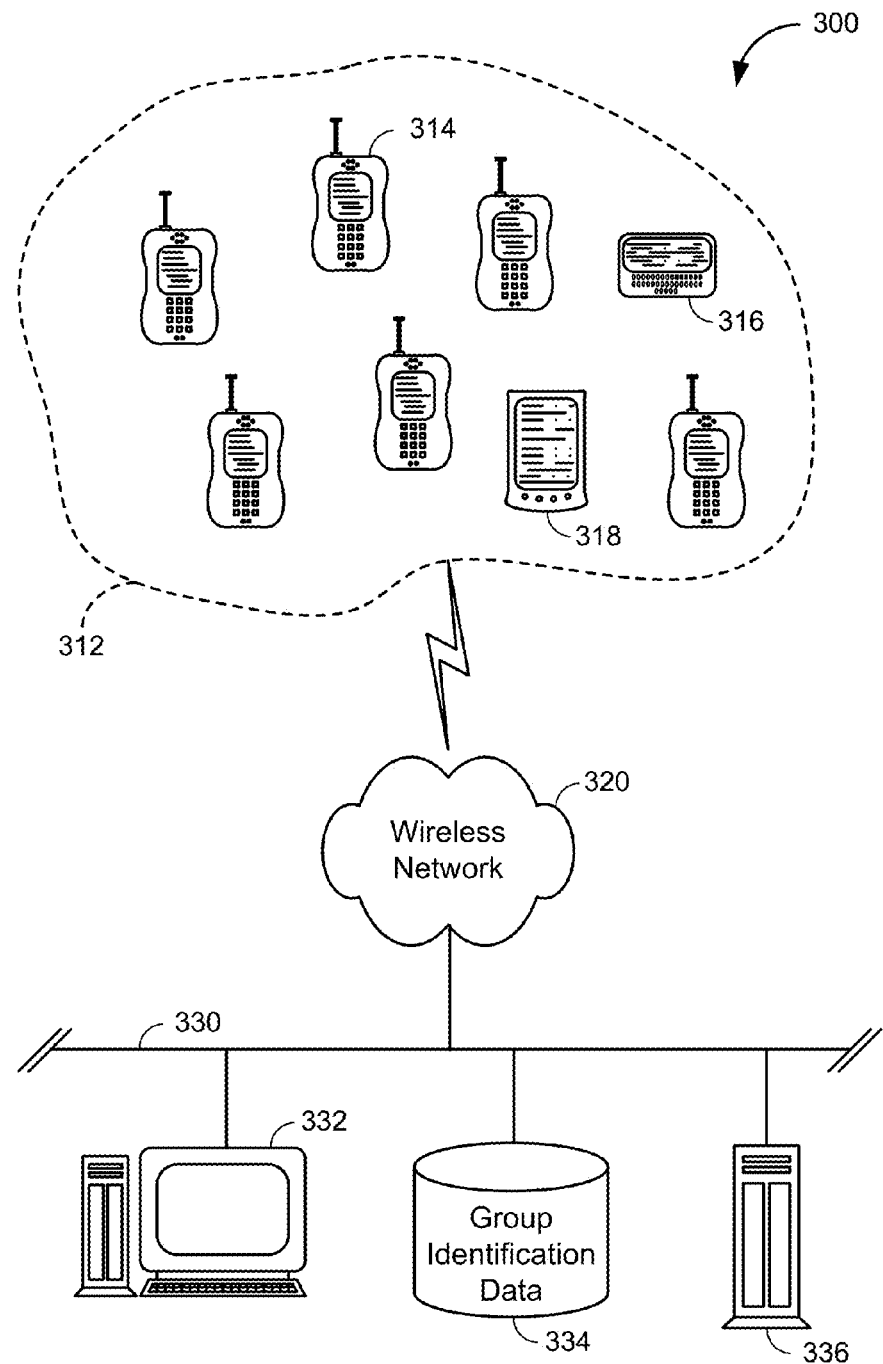
FIG. 3 illustrates an exemplary wireless communication system that may enable various wireless telecommunication devices to form a push-to-talk (PTT) group and communicate with a group communication server and other computer devices across a wireless network, according to one aspect of the disclosure.

According to various embodiments, FIG. 3 illustrates an exemplary wireless communication system 300 in which a push-to-talk (PTT) communication group 312 may include various wireless telecommunication devices, such as a wireless telephone 314, a smart pager 316, and a personal digital assistant (PDA) 318, wherein the various wireless telecommunication devices 314, 316, 318 in the PTT communication group 312 may communicate with a group communication server 332 and other computer devices across a wireless network 320. In the system 300 shown therein, each wireless telecommunication device 314, 316, 318, etc. in the PTT communication group 312 can selectively and directly communicate across the wireless communication network 320 with a target set that includes one or more other wireless telecommunication devices in the PTT communication group 312. For example, in various embodiments, the target set associated with the mobile telephone 314 can be all devices in the PTT communication group 312 or a subset thereof, such as pager 316 and PDA 318.

In various embodiments, a wireless telecommunication device in the PTT communication group 312 (e.g., mobile telephone 314) may send a flag to at least the group communication server 332, which may reside on a server-side local area network (LAN) 330 across the wireless network 320, to indicate that the wireless device is present or otherwise accessible on the wireless network 320. The group communication server 332 can then share the presence information with the target set associated with the wireless telecommunication device and/or share the presence information associated with the wireless telecommunication device with other computer devices that reside on the server-side LAN 330 or are otherwise accessible via the wireless network 320. The group communication server 332 can have an attached or accessible database 334 to store group identification data associated with the wireless telecommunication devices in the PTT communication group 312. Furthermore, in various embodiments, a data store 336, shown in FIG. 3 as a file management server, may be present on the server-side LAN 330. However, those skilled in the art will appreciate that the computer components resident on the server-side LAN 330, accessible via the wireless network 320, within the PTT communication group 312, or the Internet generally, are not limited to the exemplary components shown in FIG. 3.

In various embodiments, direct communication (e.g., a PTT communication) can be established through half-duplex channels between one or more communicating wireless telecommunication devices 314, 316, 318, etc. and/or one or more additional wireless telecommunication devices in the target set associated therewith. Furthermore, the group communication server 332 can attempt to bridge the requested direct communication with the target set if at least one wireless telecommunication device in the target set has informed the group communication server 332 that the at least one wireless telecommunication device is present or otherwise accessible on the wireless network 320. Alternatively (or additionally), the group communication server 332 can inform the wireless telecommunication device 314, 316, 318, etc. that a direct communication to the target set could not be bridged if no wireless telecommunication device (or at least one wireless telecommunication device) in the target set has not indicated presence on the wireless network 320 to the group communication server 332. Further, while FIG. 3 shows the group communication server 332 as having the attached database 334 with group identification data, in various embodiments the group communication server 332 can have the group identification data resident thereupon and perform all storage functions described herein locally.

In overview, the system 300 shown in FIG. 3 may include at least one wireless telecommunication device (e.g., mobile telephone 314) that is a member in the PTT communication group 312 that communicate with each other in direct group communications across the wireless communication network 320, wherein the at least one wireless telecommunication device may selectively send group-directed media to other members of the PTT communication group 312 and at least one group communication server 332 may store information about one or more PTT communication groups 312 on the wireless communication network 320, including the information about the identities associated with specific member wireless telecommunication devices in the PTT communication groups 312. The group communication server 32 may further selectively receive group-directed media from sending wireless telecommunication devices (e.g., mobile telephone 314) in the PTT communication group 312 and send the received group-directed media to the other member wireless telecommunication devices in the PTT communication group 312.

Additionally, in various embodiments, the system 300 can further include a data store 336 in communication with the group communication server 332, which may be configured to send group-directed media to the data store 336. The data store 336 may thereby receive the group-directed media from the wireless telecommunication device (e.g., mobile phone 314) and selectively permit members in the PTT communication group 312 to access the group-directed media stored therein across the wireless communication network 320. Furthermore, the group-directed media can be any suitable media type, which may include, without limitation, graphic media or pictures (e.g., in JPEG, TIF, and other formats), audio files (e.g., in MP3, MP4, WAV, and other formats, etc.), streaming media (e.g., PowerPoint files, MOV files, and other multimedia application files), and other application-specific data or custom application data, which may either reside at the wireless telecommunication device 314, 316, 318, etc. or in communication therewith. The group-directed media can also be an interactive session on another computer device on the wireless communication network 320 (e.g., a game hosted on data store 336 or a private bulletin board), half-duplex video conferencing among members in the PTT communication group 312 (e.g., where a picture corresponding to the speaker may be broadcast to the other group members in substantially real-time or according to a suitable delay), location information (e.g., GPS coordinates or network locations), or other suitable media types.

In various embodiments, one or more wireless telecommunication device 314, 316, 318, etc. in the PTT communication group 312 may further implement a floor control mechanism that may cause the one or more wireless telecommunication device 314, 316, 318, etc. to trigger a floor request, stream audio data during a period when the floor has been granted to the one or more wireless telecommunication device 314, 316, 318, etc., and subsequently release the floor to allow other members in the PTT communication group 312 to take the floor. Furthermore, in various embodiments, one or more wireless telecommunication device 314, 316, 318, etc. in the PTT communication group 312 may implement a handover control module that may monitor behavior during half-duplex (e.g., push-to-talk) and/or full-duplex Voice-over-Internet Protocol (VoIP) sessions with various target users and store various statistics that can be utilized to control whether and/or when to trigger a handover during subsequent VoIP sessions. For example, the statistics that the handover control module maintains may indicate an average number of times that the "parent" user (i.e., the user who owns or is otherwise associated with the wireless telecommunication device implementing the handover control module) took the floor during one or more VoIP sessions with each individual target user, an average number of times that each target user took the floor during the one or more VoIP sessions with the parent user, an average mutual silence duration between the parent user and each target user during the one or more VoIP sessions, and handover statistics that indicate average delays that occurred in relation to intra-RAT and inter-RAT handovers. Accordingly, as will be described in further detail below, the statistics that the handover control module maintains may be utilized to determine whether and/or when to trigger a handover during half-duplex and/or full-duplex VoIP sessions based on past user behavior and the particular handover type.

Figure 4:
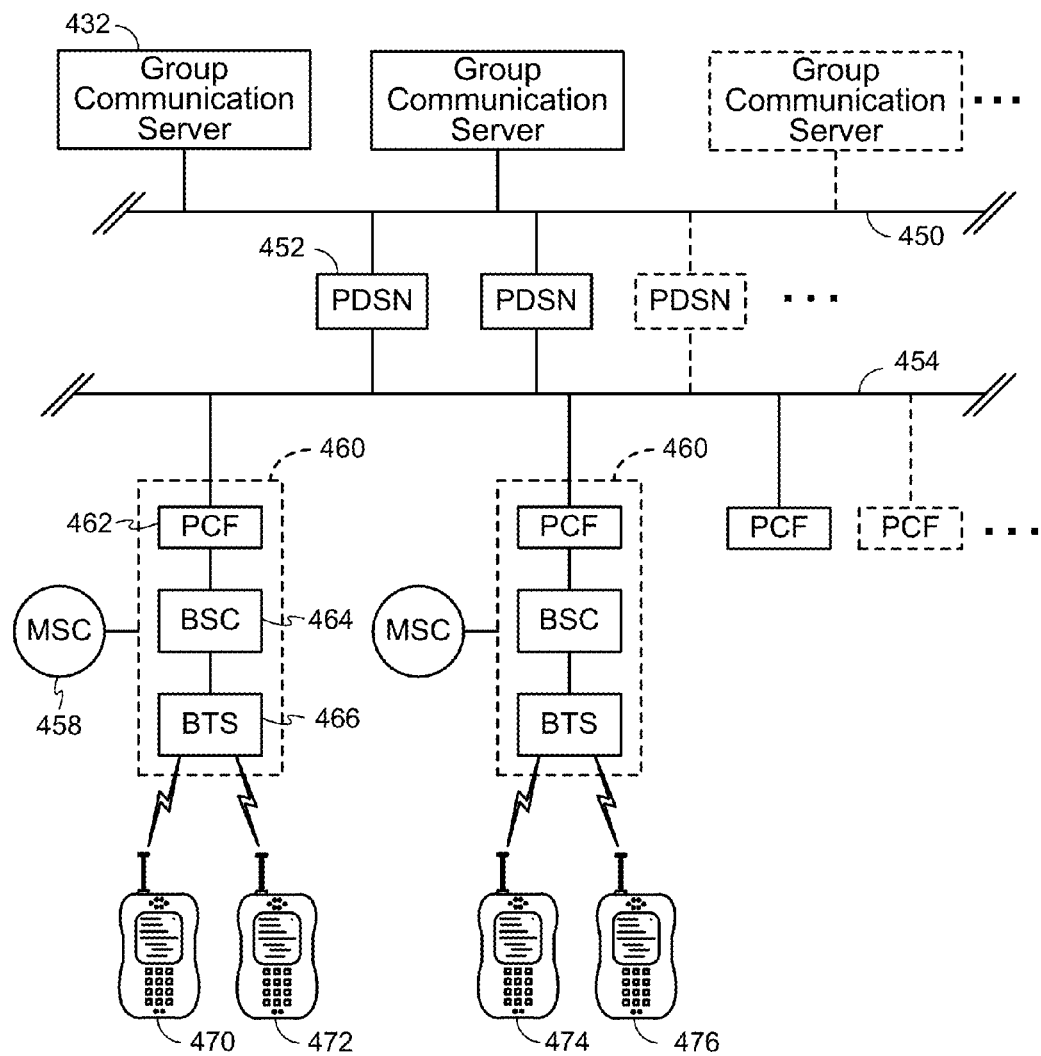
FIG. 4 illustrates an exemplary wireless network having a common cellular configuration in which one or more group communication servers are configured to control communications among various wireless telecommunication devices in a PTT group, according to one aspect of the disclosure.

According to various embodiments, FIG. 4 illustrates an exemplary wireless network having a common cellular configuration in which one or more group communication servers 432 are configured to control communications among various wireless telecommunication devices in a PTT group, which include wireless telecommunication devices 470, 472, 474, 476, etc. in the example illustrated in FIG. 4. Furthermore, those skilled in the art will appreciate that the wireless network shown in FIG. 4 is merely exemplary and can include any system in which various remote modules can communicate over-the-air between and among each other and/or between and among components in a wireless network, which may include, without limitation, wireless network carriers and/or servers. In various embodiments, the one or more group communication servers 432 may be connected to a server-side LAN 450 and wireless telecommunication devices 470, 472, 474, 476, etc. can request packet data sessions from the group communication servers 432 using suitable data service options.

In various embodiments, the one or more group communication servers 432 may be connected to a wireless service provider packet data service node (PDSN) 452 that may reside on a carrier network 454, wherein each PSDN 452 can interface with a base station controller (BSC) 464 at a base station 460 through a packet control function (PCF) 462, which may typically be located in the base station 460. The carrier network 454 may control messages, which generally comprise data packets, sent to a messaging service controller (MSC) 458 and communicate with the MSC 458 over a network, the Internet, and/or a plain ordinary telephone system (POTS). In various embodiments, the network or Internet connection between the carrier network 454 and the MSC 458 may typically transfer data, while the POTS may typically transfer voice information. Furthermore, in various embodiments, the MSC 458 can be connected to one or more base stations 460, and in a similar manner to the carrier network 454, the MSC 458 may typically be connected to a branch-to-source (BTS) 466 through the network and/or the Internet to support data transfer and through POTS to support transferring voice information. In various embodiments, the BTS 466 may ultimately broadcast and receive messages wirelessly to and from the wireless telecommunication devices 470, 472, 474, 476, etc. using short messaging service (SMS) or other suitable over-the-air methods. Those skilled in the art will further appreciate that carrier boundaries and/or PTT operator network boundaries do not inhibit or prohibit sharing data in the manner described herein.

In general, cellular telephones and mobile telecommunication devices (e.g., wireless telecommunication devices 470, 472, 474, 476, etc.) are being manufactured with increased computing capabilities and are becoming tantamount to personal computers and hand-held PDAs. These "smart" cellular telephones allow software developers to create software applications that can be downloaded and executed on a processor associated with the wireless telecommunication devices 470, 472, 474, 476, etc. (e.g., web pages, applets, MIDlets, games, data, etc.). Furthermore, in wireless telecommunication devices that have designated a PTT communication group (e.g., PTT communication group 312 as shown in FIG. 3), the wireless communication devices can directly connect with other members in the PTT communication group to engage in voice and data communication. However, all such direct communications will occur typically through, or under the control of, the one or more group communication servers 432. Although all data packets communicated among the wireless telecommunication devices 470, 472, 474, 476, etc. do not necessarily have to travel through the one or more group communication servers 432, the one or more group communication servers 432 may generally provide ultimate control over the communicated data packets because the group communication servers 432 are typically the only components on the server-side LAN 450 that may know and/or retrieve the identities associated with the members in the PTT communication group, or direct the identities associated with the members in the PTT communication group to other computer devices.

Figure 5:
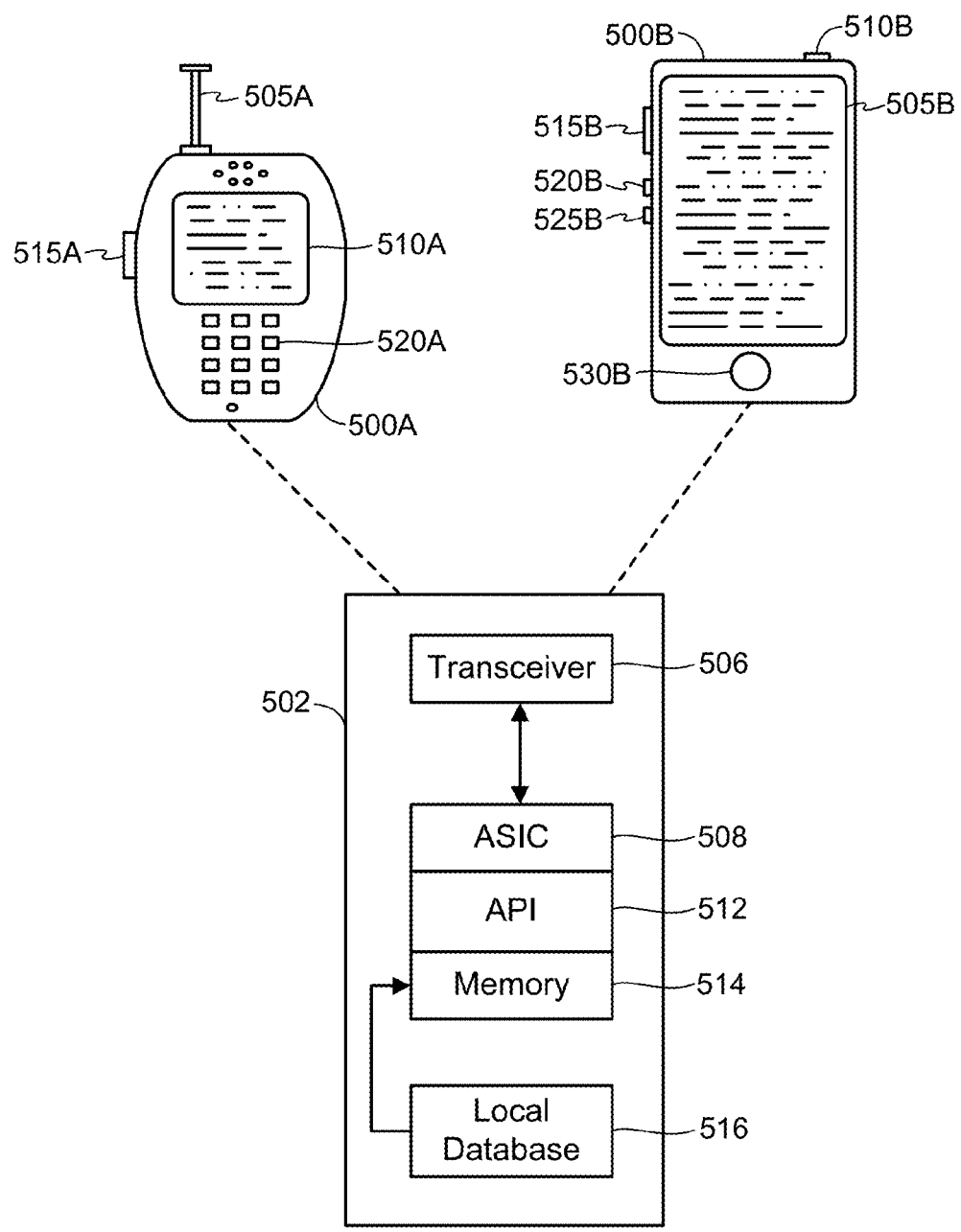
FIG. 5 illustrates exemplary wireless telecommunication devices with computer platforms that can support PTT capabilities, according to one aspect of the disclosure.

According to various embodiments, FIG. 5 illustrates exemplary wireless telecommunication devices that may have computer platforms that can supports PTT capabilities. In particular, FIG. 5, wireless telecommunication device 500A is illustrated as a calling telephone and wireless telecommunication device 500B is illustrated as a touch-screen device (e.g., a smart phone, a tablet computer, etc.). As shown in FIG. 5, an external casing of wireless telecommunication device 500A is configured with an antenna 505A, display 510A, at least one button 515A (e.g., a PTT button, a power button, a volume control button, etc.) and a keypad 520A among other components, as is known in the art. Also, an external casing of wireless telecommunication device 500B is configured with a touchscreen display 505B, peripheral buttons 510B, 515B, 520B and 525B (e.g., a power control button, a volume or vibrate control button, an airplane mode toggle button, etc.), at least one front-panel button 530B (e.g., a Home button, etc.), among other components, as is known in the art. In various embodiments, the PTT button 515A and/or other peripheral buttons 510B, 515B, 520B and 525B may be used to open direct communication to a target set that includes one or more member devices in a communication group. However, those skilled in the art will appreciate that other devices and methods can be alternately used to engage in a PTT communication, such as a "soft key" on touch screen display 505B, other methods as known in the art, and/or or the voice-activated floor control mechanisms that will be described in further detail below. Furthermore, in addition to presenting information about ongoing group communications and/or PTT communications, the display 510A and/or 505B can present information that can be used to control or otherwise configure the voice-activated floor control mechanisms described more fully below.

In various embodiments, while not shown explicitly as part of wireless telecommunication device 500B, the wireless telecommunication device 500B can include one or more external antennas and/or one or more integrated antennas that are built into the external casing of wireless telecommunication device 500B, including but not limited to Wi-Fi antennas, cellular antennas, satellite position system (SPS) antennas (e.g., global positioning system (GPS) antennas), and so on, and the wireless telecommunication device 500A may likewise include one or more external and/or integrated antennas in addition to the antenna 505A. In any case, the one or more external and/or integrated antennas (including at least the antenna 505A) can be used to open a direct communication channel with the wireless telecommunication devices 500A and/or 500B and thereby provide a direct communication interface to the wireless telecommunication devices 500A and/or 500B, wherein the direct communication interface may typically comprise hardware known to those skilled in the art. Furthermore, in various embodiments, the direct communication interface can integrate with standard communication interfaces associated with wireless telecommunication devices 500A and/or 500B that are ordinarily used to carry voice and data transmitted to and from the wireless telecommunication devices 500A and/or 500B.

Furthermore, although internal components of wireless telecommunication device 500A and wireless telecommunication device 500B can be embodied with different hardware configurations, FIG. 5 shows a platform 502 that may provide a basic high-level configuration for internal hardware components associated with wireless telecommunication devices 500A and/or 500B. In particular, the platform 502 can generally receive and execute software applications, data and/or commands transmitted from a cellular network that may ultimately come from the core network, the Internet, and/or other remote servers and networks (e.g., an application server, web URLs, etc.). The platform 502 can also independently execute locally stored applications without cellular network interaction. The platform 502 can include a transceiver 506 coupled to an application specific integrated circuit (ASIC) 508, or other processor, microprocessor, logic circuit, or other data processing device, wherein the transceiver 506 may comprise a receiver that can receive a signal from, for instance, a receive antenna (e.g., the antenna 505A associated with wireless telecommunication device 500A, one or more external and/or integrated antennas associated with wireless telecommunication devices 500A and/or 500B, etc.), perform typical actions on the received signal (e.g., filtering, amplifying, downconverting, etc.), digitize the conditioned signal to obtain samples, and demodulate received symbols that are then provided to the ASIC 508 or other processor for channel estimation. Furthermore, the transceiver 506 may comprise a transmitter that can transmit a signal using a transmit antenna (e.g., the antenna 505A associated with wireless telecommunication device 500A, one or more external and/or integrated antennas associated with wireless telecommunication devices 500A and/or 500B, etc.).

In various embodiments, the ASIC 508 or other processor coupled to the transceiver 506 may execute the application programming interface (API) 512 layer that interfaces with any application environment resident in the memory 514, which can include the operating system loaded on the ASIC 508 and/or any other resident programs in the memory 514 (e.g., the "binary runtime environment for wireless" (BREW) wireless device software platform developed by QUALCOMM®). The memory 514 can be comprised of read-only memory (ROM) or random-access memory (RAM), electrically erasable programmable ROM (EEPROM), flash cards, or any memory common to computer platforms. The platform 502 also can include a local database 516 that can store applications not actively used in memory 514, as well as other data. The local database 516 is typically a flash memory cell, but can be any secondary storage device as known in the art, such as magnetic media, EEPROM, optical media, tape, soft or hard disk, or the like.

Accordingly, an aspect of the disclosure can include wireless telecommunication devices 500A, 500B, etc. that have the ability to perform the functions described herein. As will be appreciated by those skilled in the art, the various logic elements can be embodied in discrete elements, software modules executed on a processor or any combination of software and hardware to achieve the functionality disclosed herein. For example, ASIC 508, memory 514, API 512 and local database 516 may all be used cooperatively to load, store and execute the various functions disclosed herein and thus the logic to perform these functions may be distributed over various elements. Alternatively, the functionality could be incorporated into one discrete component. Furthermore, certain wireless telecommunication devices that may be used in the various embodiments disclosed herein may not include certain components and/or functionalities associated with the wireless telecommunication devices 500A and 500B shown in FIG. 5. For example, certain wireless devices may support PTT communication despite not having a PTT button 515A or other peripheral buttons 510B, 515B, 520B and 525B that can provide a function corresponding to a PTT button 515A (e.g., a smartwatch running a PTT client), whereby wireless devices that support PTT communication despite not having a PTT button 515A or other physical mechanism that can provide a function corresponding thereto may nonetheless achieve substantially the same functionality using the voice-activated floor control mechanisms that will be described in further detail below. However, those skilled in the art will appreciate that the wireless telecommunication devices 500A and 500B shown in FIG. 5 that do have a PTT button 515A or other peripheral buttons 510B, 515B, 520B and 525B that can provide a function corresponding thereto may likewise use and obtain the benefits from the voice-activated floor control mechanisms that will be described in further detail below (e.g., to trigger floor requests, floor releases, and other floor-related functions in a hands-free environment). Therefore, those skilled in the art will appreciate that the features associated with the wireless telecommunication devices 500A and 500B shown in FIG. 5 are merely illustrative and the disclosure is not limited to the illustrated features or arrangements.

The wireless communication between the wireless telecommunication devices 500A and/or 500B can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the wireless telecommunication devices 500A and/or 500B from and using various networks and network configurations. Accordingly, the illustrations provided herein are not intended to limit the aspects of the disclosure and are merely to aid in the description of various aspects disclosed herein.

Figure 6:
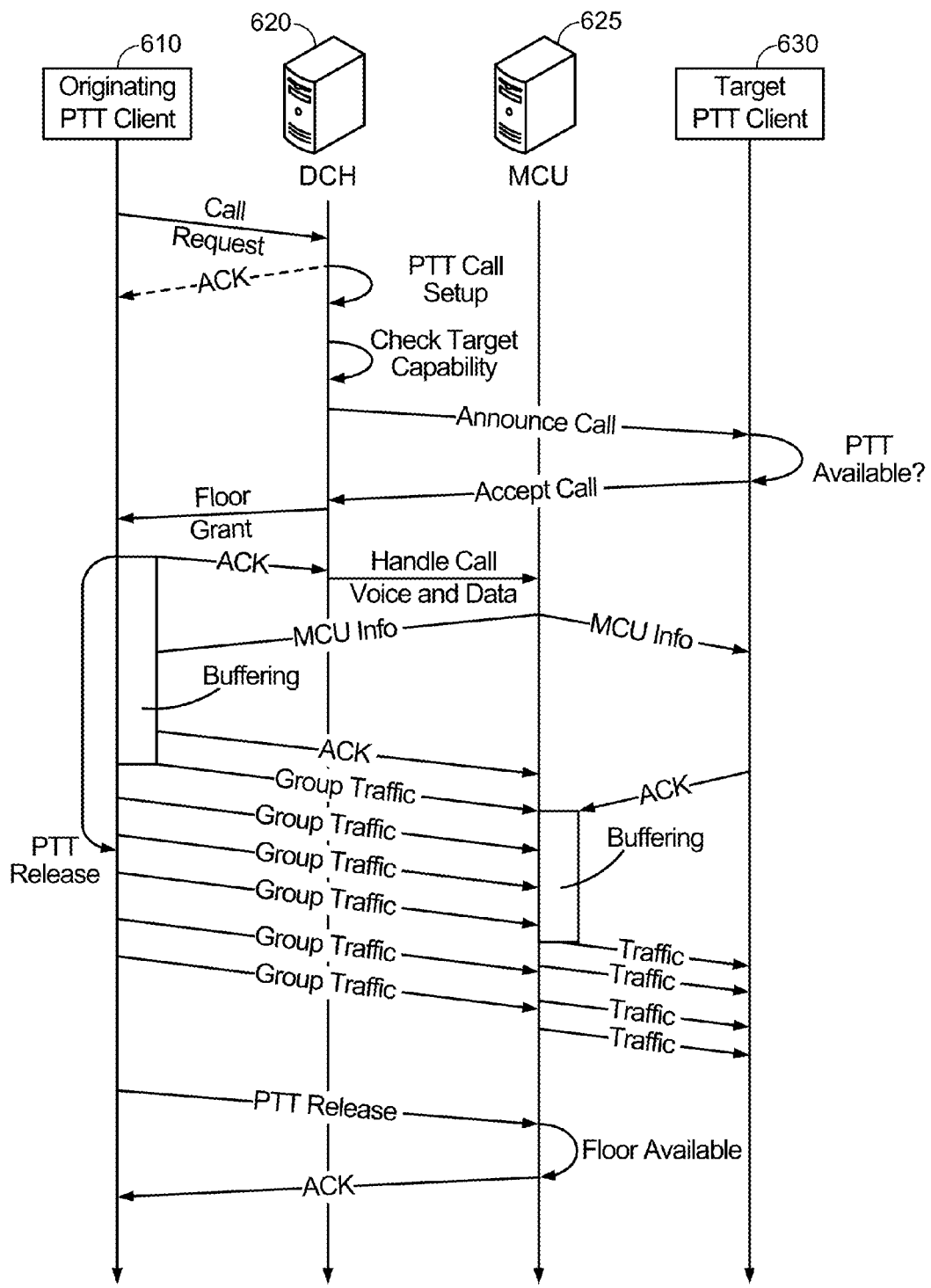
FIG. 6 illustrates an exemplary signaling call flow in which a wireless device may initiate a PTT group communication, receive an initial floor grant, and subsequently release the floor to allow other PTT group members to take the floor, according to one aspect of the disclosure.

According to various embodiments, FIG. 6 illustrates an exemplary signaling call flow in which an originating wireless device (or originating PTT client) 610 may initiate a PTT group communication, receive an initial floor grant, and subsequently release the floor to allow other PTT group members to take the floor. In particular, in response to the originating PTT client 610 requesting a direct PTT call with at least one target wireless device (or target PTT client) 630, the originating PTT client 610 may transmit a call setup request to a Dispatch Call Handler (DCH) 620. For example, in various embodiments, the call setup request may include an address associated with the target PTT client 630, an application identifier associated with the target PTT client 630, and/or other suitable information associated with the target PTT client 630 that may be communicated to the DCH 620 to initiate a PTT group call. The DCH 620 may then perform the PTT call setup functions, which may include locating the target PTT client 630, applying any appropriate call restrictions, selecting a vocoder, and assigning a Media Control Unit (MCU) 625 resource. In addition, the DCH 620 may check capabilities associated with the target PTT client 630 to verify that the target PTT client 630 can support the requested PTT communication. In response to suitably verifying that the target PTT client 630 can support the requested PTT communication, the DCH 620 may then send a message announcing the call to the target PTT client 630, which may transmit a message accepting the PTT call to the DCH 620 in response to determining that PTT communications are available on the target PTT client 630.

In various embodiments, in response to receiving the acknowledgement accepting the call from the target PTT client 630, the DCH 620 may transmit a floor grant message to the originating PTT client 610, which may indicate that the PTT call is being established and the originating PTT client 610 can start collecting media (e.g., voice data or other appropriate media). As such, the originating PTT client 610 may notify the user that the floor was granted and that the user can therefore start to speak, wherein the originating PTT client 610 may collect and buffer voice media (i.e., the talk spurt collected from the user via the vocoder). In response to the originating PTT client 610 receiving and acknowledging a contact information message from the MCU 625, the buffered voice media (or group traffic) may be sent to the MCU 625, which may likewise buffer the voice media and forward the group traffic to the target PTT client 630 after receiving an acknowledgement to the contact information message from the target PTT client 630. At some subsequent point in time, the originating PTT client 610 may release the initial floor grant and transmit a PTT release message to the MCU 625, which may then release the floor and send a message acknowledging the floor release to the originating PTT client 610. Accordingly, the originating PTT client 610, the target PTT client 630, and/or any other PTT clients that may be participating in the PTT call may then take the floor in a substantially similar manner.

In various embodiments, during a PTT call, a full-duplex call, or other real-time multimedia session in which a wireless device communicates over a wireless access network, certain conditions may trigger a handover to switch the wireless device from a current base station to a target base station and/or from a current access network to a different access network. For example, user mobility may trigger a handover where the wireless device approaches the edge of the coverage area associated with a current base station or access network, radio conditions may trigger a handover where the wireless device receives stronger signals from a neighbor base station or access network than a current base station or access network, cell capacity may trigger a handover where a neighbor base station or access network has less loading than the current base station or access network, and so on. However, depending on the target base station and/or the target access network, the voice call or other real-time multimedia session may end if the handover delay results in inactivity leading to a dropped call, perceivable "clicks" may occur due to packet loss and/or delays during the handover, whereby handovers that are triggered while a wireless device is involved in a voice call or other real-time multimedia session may cause session interruption, packet delay, packet loss, and degraded user experience, among other problems.

Figure 7:
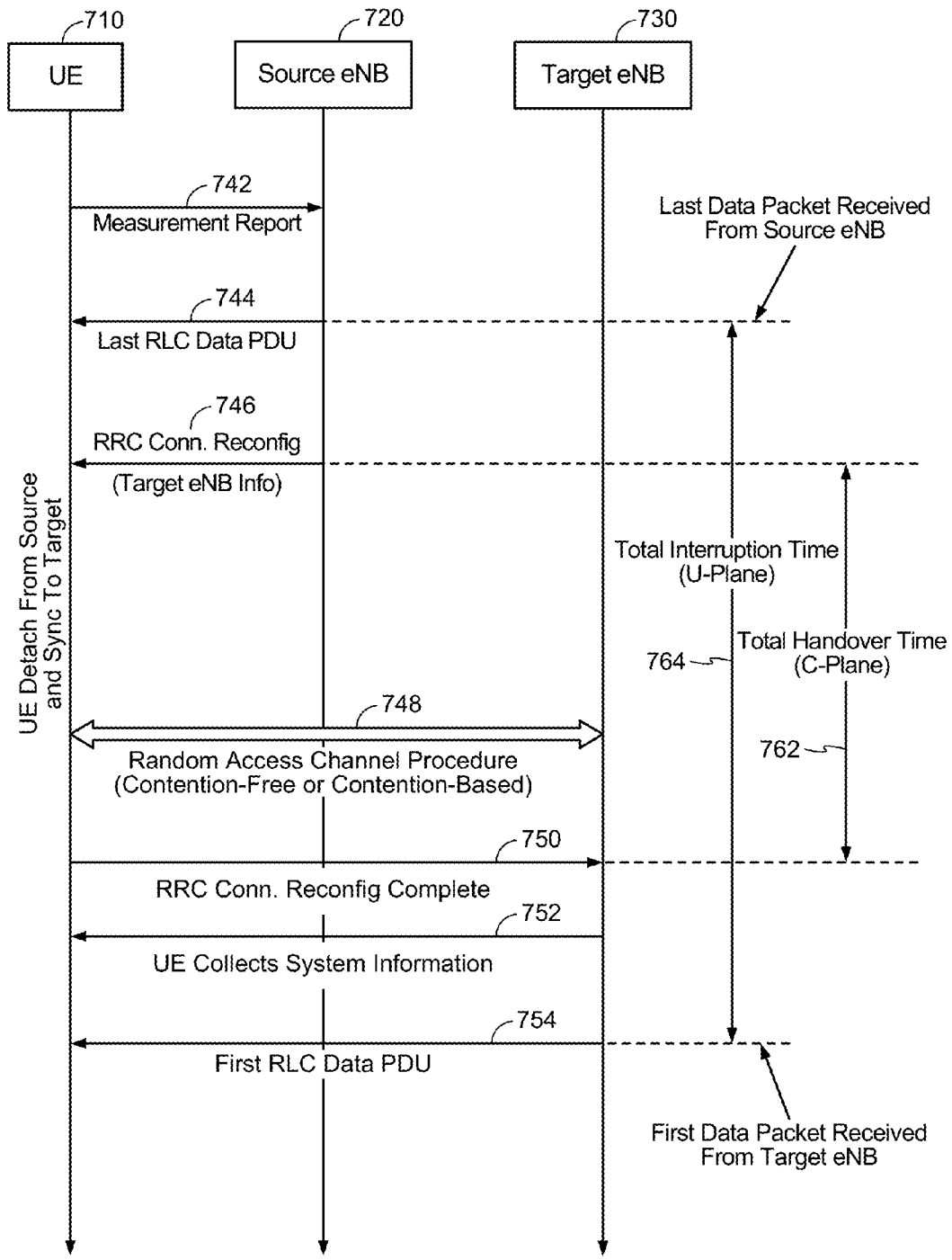
FIG. 7 illustrates an exemplary signaling call flow associated with an intra-LTE handover in an LTE network, according to one aspect of the disclosure.

For example, according to various embodiments, FIG. 7 illustrates an exemplary signaling call flow associated with an intra-LTE handover in an LTE network, which may generally correspond to a handover where a wireless device (or UE) 710 detaches from a source eNB 720 and synchronizes to a target eNB 730 using an X2 interface that provides a reference point between the source eNB 720 and the target eNB 730 used for UE handovers. In particular, at 742, the UE 710 may transmit a measurement report to the source eNB 720, wherein the measurement report may indicate a strength at which a signal was received from the source eNB 720, a strength at which a signal was received from the target eNB 730, or any other suitable measurement information that the UE 710 may be configured to report to the source eNB 720. In the illustrated example, the source eNB 720 may determine that conditions warrant triggering a handover to the target eNB 730 based on the measurement report received from the UE 710. As such, the UE 710 may receive a Radio Link Control (RLC) Protocol Data Unit (PDU) from the source eNB 720 at 744 and the UE 710 may further receive a Radio Resource Control (RRC) connection reconfiguration message from the source eNB 720 at 746, wherein the RLC PDU received at 744 may represent the last data packet that the UE 710 receives from the source eNB 720 and the RRC connection reconfiguration message includes information associated with the target eNB 730.

In various embodiments, the UE 710 may then detach from the source eNB 710 and perform either a contention-free or contention-based Random Access Channel (RACH) procedure to synchronize to the target eNB 730 at 748. Accordingly, after the UE 710 successfully synchronizes to the target eNB 730, at 750 the UE 710 may transmit an RRC connection reconfiguration complete message to the target eNB 730. In that context, a duration between the time when the UE 710 received the RRC connection reconfiguration message from the source eNB 720 to the time when the UE 710 transmitted the RRC connection reconfiguration complete message to the target eNB 730 may represent a total control plane (C-Plane) handover time 762. In various embodiments, after transmitting the RRC connection reconfiguration complete message to the target eNB 730, the UE 710 may then collect system information from the target eNB at 752 and receive a first RLC PDU from the target eNB 730 at 754, wherein the first RLC PDU received at 754 may represent the first data packet that the UE 710 receives from the target eNB 730. In that context, a duration between the time when the UE 710 received the last data packet from the source eNB 720 at 744 to the time when the UE 710 received the first data packet from the target eNB 730 at 754 may represent a total user plane (U-Plane) interruption time 764. Moreover, as shown in FIG. 7, the RACH procedure performed between the UE 710 and the target eNB 730 may be contention-free or contention-based, which may impact the total C-Plane handover time 762 and consequently impact the total U-plane interruption time 764. For example, in a contention-free RACH procedure, the target eNB 730 generally allocates a Random Access Preamble from a reserved pool such that no collisions will occur. In contrast, in a contention-based RACH procedure, multiple UEs may attempt to connect to the target eNB 730 at the same time such that collisions may occur in the event that multiple UEs transmit the same Preamble identifier. As such, in various embodiments, whether the RACH procedure performed at 748 is contention-free or contention-based may impact the total C-Plane handover time 762 and the total U-Plane interruption time 764. For example, minimum, mean, and maximum U-Plane interruption times 764 that may occur in X2 based intra-LTE handovers that use a contention-based or a contention-free RACH procedure are shown below in Table 2.

TABLE 2

Handover Interruption Times

| RACH Procedure During Handovers | Minimum U-Plane Delay (ms) | Mean U-Plane Delay (ms) | Maximum U-Plane Delay (ms) |
|---|---|---|---|
| Contention-Based | 39.0 | 50.0 | 80.0 |
| Contention-Free | 40.0 | 62.3 | 139.0 |

Accordingly, in the exemplary intra-LTE handover shown in FIG. 7, the total U-Plane interruption time 764 can have a substantial effect on continuity, packet delay, packet loss, user experience, and/or other aspects associated with a real-time session, which may further depend on whether a contention-based or contention-free RACH procedure is used to synchronize the UE 710 to the target eNB 730. Moreover, the total U-Plane interruption time 764 typically increases in handovers where the UE 710 switches from a current access network that implements a first radio access technology (RAT) to a target access network that implements a different RAT (i.e., "inter-RAT" handovers), and the total U-Plane interruption time 764 may also increase in inter-system handovers (e.g., between 3GPP and non-3GPP accesses). For example, various inter-RAT handover types and inter-system handover types that may cause session interruption, packet delay, packet loss, and otherwise degrade user experience during a VoIP session or other real-time multimedia session are defined below in Table 3.

TABLE 3

Handover Types (3GPP Perspective)

| Handover Type | Description |
| --- | --- |
| Inter-RAT 3GPP Handover | Intra E-UTRAN<br>E-UTRAN to/from UTRAN<br>E-UTRAN to/from GERAN<br>Intra-GERAN, Intra-UTRAN, and GERAN to/from UTRAN |
| Inter-system Handover 3GPP and Non-3GPP Accesses | Optimized handover E-UTRAN to/from HRPD (GTP and PMIP)<br>Basic non-optimized handover :: trusted non-3GPP access (including eHRPD) to/from GERAN, UTRAN, and/or E-UTRAN<br>Basic non-optimized handover :: untrusted non-3GPP access (includinge HRPD) to/from GERAN, UTRAN, and/or E-UTRAN |

Figure 8:
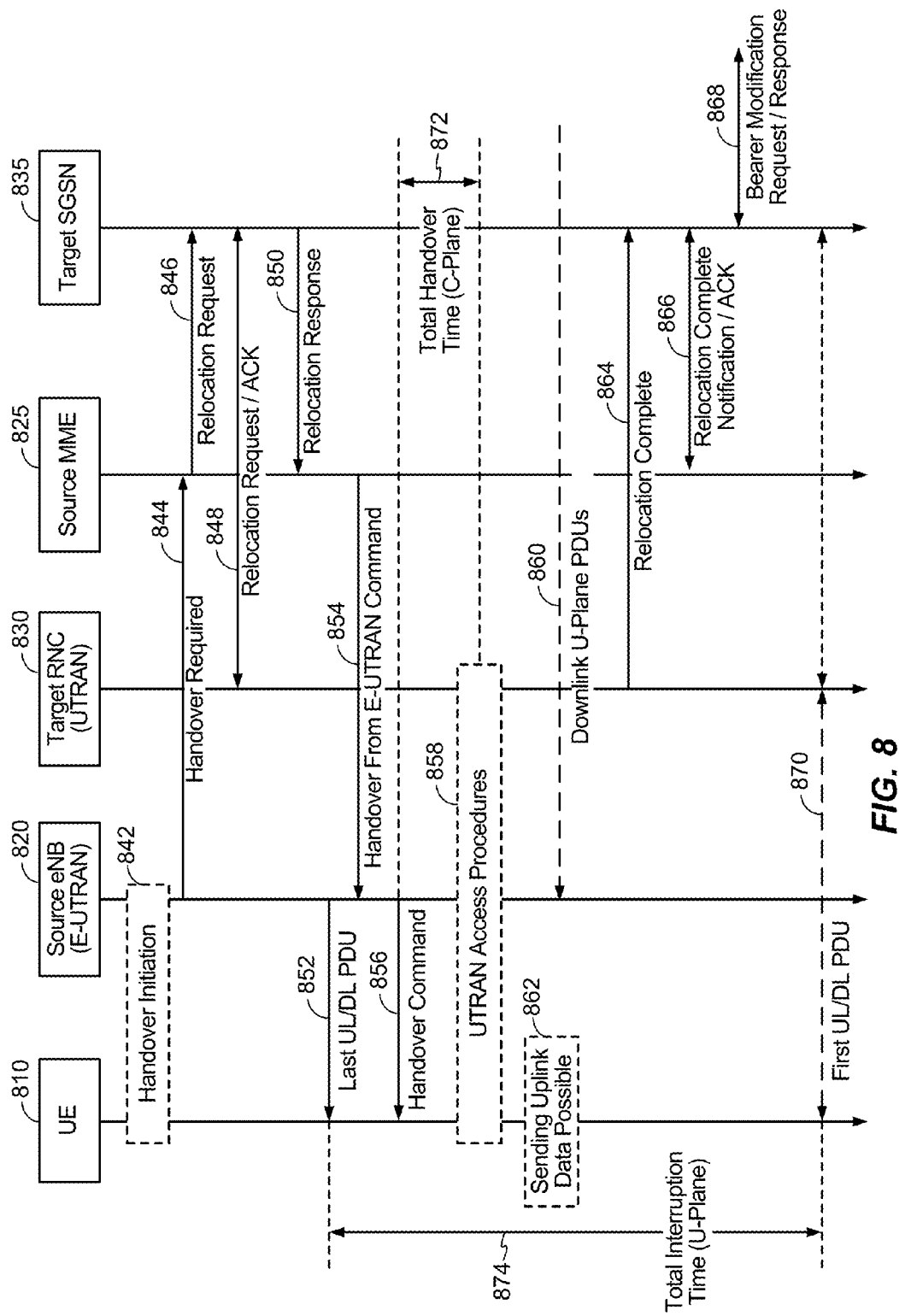
FIG. 8 illustrates an exemplary signaling call flow associated with an E-UTRAN to UTRAN intra-RAT handover, according to one aspect of the disclosure.

Referring now to FIG. 8, an exemplary signaling call flow associated with an E-UTRAN to UTRAN intra-RAT handover is illustrated to demonstrate how inter-RAT and inter-system handovers may interfere with VoIP or other real-time multimedia sessions. More particularly, as shown in FIG. 8, an inter-RAT handover from a source access network to a target access network may be initiated at 842 (i.e., from E-UTRAN to UTRAN in the illustrated example), at which time uplink and downlink user data may be transmitted via a bearer between the UE 810 and a source eNB 820 and one or more GTP tunnels between the source eNB 820 and one or more core network entities (not shown). In various embodiments, at 844, the source eNB 820 may then send a handover required message to a source MME 825 to request that the core network establish resources in the target access network 830. In various embodiments, the source MME 825 may then determine that the handover type is an inter-RAT handover to UTRAN from information in the handover required message from the source eNB 820 that identifies the target RNC 830. Accordingly, the source MME 825 then initiates a handover resource allocation procedure at 846, which may include sending a relocation request message to the target SGSN 835.

At 848, the target SGSN then relays the relocation request message to the target RNC 830 to establish the radio network resources (e.g., radio access bearers) for the UE 810 in the target RNC 830. For example, for each radio access bearer (RAB) that the target SGSN 835 requests be established, the relocation request message sent at 848 may include a RAB identifier, one or more RAB parameters, a transport layer address (e.g., the S-GW address for user plane data where a direct tunnel is used or the SGSN address where a direct tunnel is not used), and a transport association (e.g., an uplink Tunnel Endpoint Identifier Data (TEID) in the S-GW or SGSN). Accordingly, at 848, the target RNC 830 allocates the requested resources and returns the applicable parameters to the target SGSN 835 in a relocation request acknowledgement message, wherein the target RNC 830 may be prepared to receive downlink GTP PDUs from the S-GW (or the target SGSN 835 where a direct tunnel is not used) for the accepted RABs upon sending the relocation request acknowledgement message to the target SGSN 835. In various embodiments, at 850, the target SGSN 835 may send a relocation response message to the source ME 825, wherein the relocation response message may indicate whether a new S-GW has been selected, a destination tunnel endpoint for data forwarding in the target RNC 830, one or more data forwarding parameters depending on whether direct or indirect forwarding applies, and/or other suitable information to assist in relocating the UE 810 to the target RNC 830.

In various embodiments, the signaling that occurs from 842 through 850 generally relates to a preparation phase in the inter-RAT handover from E-UTRAN to UTRAN. Accordingly, uplink and downlink PDUs may continue to be transmitted between the UE 810 and the source eNB 820 until the source MME 825 sends a handover command to the source eNB 820 at 854 to complete the inter-RAT handover preparation phase towards the source eNB 820. Accordingly, an uplink and/or downlink PDU transmitted at 852 may represent the last data packet that the UE 810 sends to and/or receives from the source eNB 820, which initiates data forwarding to the target RNC 830 or alternatively via the S-GW (not shown) as decided by the source MME 825 and/or the target SGSN 835 during the handover preparation phase.

Furthermore, at 856, the source eNB 820 may send a handover command to the UE 810 to trigger the handover to the target radio access network, wherein the handover command sent to the UE 810 may include various parameters that the target RNC 830 established during the preparation phase. In response to receiving the handover command from the source eNB 820, the UE 810 may associate one or more bearer IDs with the respective RABs and suspend transmitting user plane data on an uplink. In various embodiments, at 858, the UE 810 moves to the target UTRAN (3G) system and executes the inter-RAT handover according to the parameters provided in the handover command message received at 856, wherein the inter-RAT handover from the source E-UTRAN to the target UTRAN may be complete once the UTRAN access procedures are successfully completed at 858, whereby a duration between the time when the UE 810 received the handover command from the source eNB 820 to the time when the UE 810 successfully completed the UTRAN access procedures may represent a total control plane (C-Plane) inter-RAT handover time 872.

At that time, the UE 810 may resume transmitting uplink user plane data at 862 on one or more Network Layer Access Point Identifiers (NSAPIs) having radio resources allocated in the target RNC 830. However, the source eNB 820 may continue to receive downlink user plane PDUs at 860, which the source eNB 820 may relay to either the target RNC 830 where direct forwarding applies or to the source S-GW that then further relays the downlink user plane PDUs to the target RNC 830 via a target S-GW where indirect forwarding applies. In either case, at 864, the target RNC 830 may send a relocation complete message to the target SGSN 835 to indicate that the relocation from the source E-UTRAN to the target UTRAN completed, at which time the target SGSN 835 may be prepared to receive data from the target RNC 830 and forward each received uplink PDU directly to the S-GW. In various embodiments, at 866, the target SGSN 835 may inform the source MME 825 that the UE 810 arrived on the target access network through a relocation complete notification and the source MME 825 may further send a message to the target SGSN 835 to acknowledge the information included in the relocation complete notification. Furthermore, in various embodiments, the source MME 825 may start a timer to supervise when to release resources in the source eNB 820 and the source S-GW (if the S-GW was relocated). For example, when the timer expires, the source MME 825 generally releases all bearer resources allocated to the UE 810 and further deletes any EPS bearer resources if the S-GW was relocated, and upon receiving the relocation complete acknowledgement message, the target SGSN 835 may start a timer if the target SGSN 835 allocated S-GW resources for indirect forwarding.

In various embodiments, the target SGSN 835 may then complete the inter-RAT handover procedure, which may include sending a modify bearer request message to the S-GW at 868 in order to inform the S-GW that the target SGSN 835 now manages all EPS bearer contexts that the UE 810 has established. The S-GW may then communicate with a PDN GW to coordinate modifying the bearers associated with the UE 810 and subsequently transmit a modify bearer response to the target SGSN 835 to acknowledge that the user plane switch successfully completed and that the user plane path has been established for all EPS bearer contexts between the UE 810, the target RNC 830, the target SGSN 835 (where a direct tunnel is not used), the S-GW, and the PDN GW. Accordingly, the UE 810 may receive a first downlink PDU from the target RNC 730 at 870, whereby a duration between the time when the UE 810 received the last PDU from the source eNB 820 at 852 to the time when the UE 810 received the first PDU from the target RNC 830 at 870 may represent a total user plane (U-Plane) interruption time 874. Accordingly, due at least in part to the substantial signaling between the source access network and the target access network required to complete the inter-RAT handover, substantial U-Plane interruption time 874 may occur in inter-RAT and inter-system handovers. Additional detail relating to the inter-RAT handover procedure shown in FIG. 8 can be found in 3GPP Technical Specification 23.401.

Accordingly, to reduce the potential negative effects and the interruption, packet delay, packet loss, and degraded user experience that handovers can cause during VoIP sessions or other real-time multimedia sessions, the various embodiments described in further detail herein may utilize characteristics associated with PTT sessions and/or full-duplex VoIP sessions to obtain user behavior statistics that can be used to determine whether and/or when to trigger a handover. For example, according to various embodiments, FIG. 9 illustrates an exemplary group communication platform 900 that can be used to control handovers during a PTT and/or full-duplex VoIP session.

Figure 9:
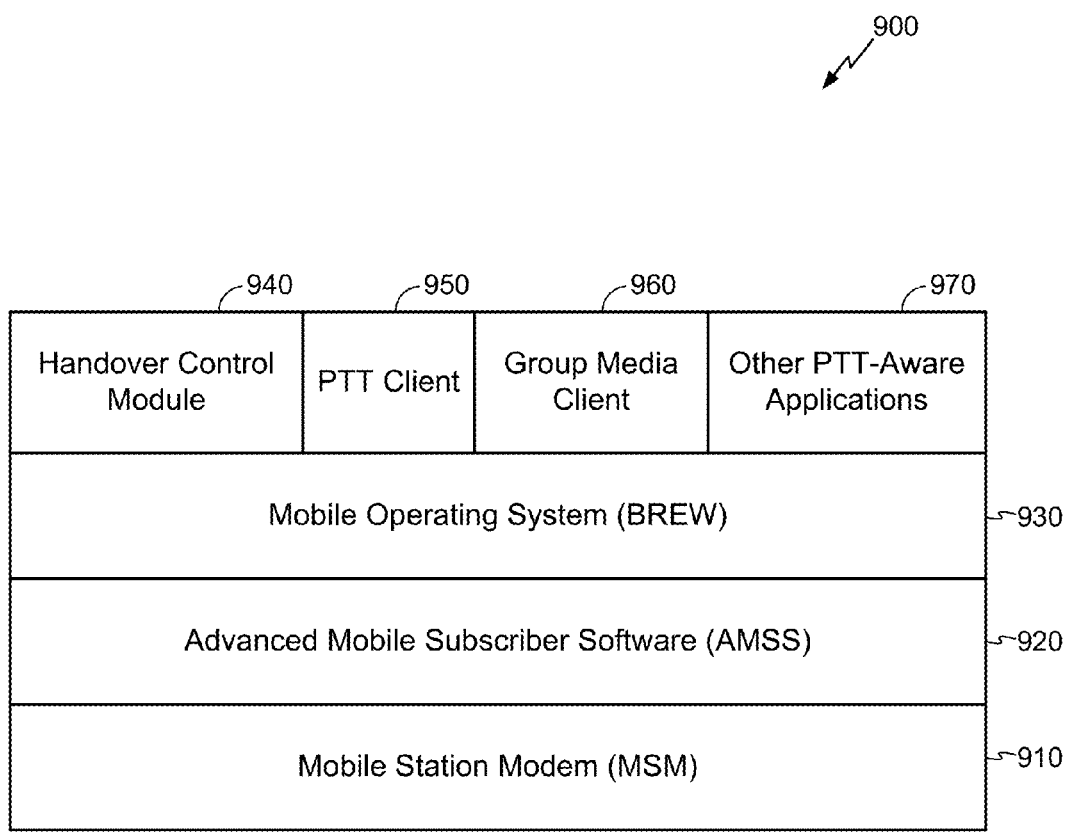
FIG. 9 illustrates an exemplary group communication platform that can control handovers during a PTT session, according to one aspect of the disclosure.

More particularly, according to various embodiments, the group communication platform 900 shown in FIG. 9 includes a Mobile Station Modem (MSM) 910 and various software layers that are generally "layered" above the MSM 910. For example, as shown in FIG. 9, the various software layers in the group communication platform 900 may include Advanced Mobile Subscriber Software (AMSS) 920 "layered" above the MSM 910, a mobile operating system layer 930 (e.g., implementing the BREW® software platform mentioned above) layered above the AMSS 920, and an application layer above the mobile operating system layer 930, wherein the application layer may generally include a handover control module 940, a PTT client 950, a group media client 960, and other PTT-aware applications 970. Accordingly, the various software layers in the group communication platform 900 may drive an underlying chipset associated with the MSM 910 and implement a CDMA communication technologies suite that includes CDMA2000 1× and CDMA2000 1×EV-DO according to a software protocol stack. For example, in one embodiment, the mobile operating system layer 930 may provide one or more application programming interfaces (APIs) for chip-specific and/or device-specific operations and further provide an isolation layer that eliminates direct contact with the AMSS 920 and any OEM software on the group communication platform 900. Furthermore, the mobile operating system layer 930 enables application development that uses mobile device features without having to rewrite the application each time a new release of the device-specific software is released. However, those skilled in the art will appreciate that the group communication platform 900 can alternatively implement the various embodiments disclosed herein using other software configurations (e.g., Linux®, Windows®, or other operating systems or architectures).

According to various embodiments, the PTT client 950 may generally comprise an application that may offer access to PTT services through an external and/or internal interface (e.g., a PTT-aware user interface). In general, the PTT client 950 may include all the functionality that applications may require to run on the mobile operating system 930, such as the handover control module 940 and the group media client 960. In addition to providing access to PTT services, the PTT client 950 may provide a layer to isolate all PTT-aware applications 970 and interfaces to a group communication server or other network-side components. As such, in one embodiment, the PTT client 950 may maintain access to PTT services, respond to group communication requests, process all requests that relate to PTT services from the PTT-aware applications 970, process all outgoing PTT requests, collect and package vocoder data packets associated with originated PTT talk spurts, parse vocoder data packets associated with terminated PTT talk spurts, and detect mutual silence that occurs between the time when a PTT talk spurt ends and a new PTT talk spurt begins.

According to various embodiments, the group media client 960 may comprise a mobile operating system-based application that extends PTT services to media types other than traditional half-duplex voice communications (e.g., full-duplex VoIP sessions). As such, the group media client 960 may provide access to group media services through the external and/or internal PTT-aware user interface. For example, in various embodiments, the PTT-aware user interface may comprise a mobile operating system-based application or an application used in combination with an interface to the AMSS 920. In general, the PTT-aware user interface may invoke the appropriate APIs (e.g., APIs associated with other resident PTT-aware applications 970) in response to user requests that may relate to group-directed media services. The group media client 960 may thereby service the user requests and inform the user about the result associated with any group-directed media requests.

According to various embodiments, as noted above, the software layers included in the group communication platform 900 shown in FIG. 9 may further include a handover control module 940 that can be used to determine whether and/or when to trigger a handover during a PTT or full-duplex voice communication session, wherein the handover control module 940 may communicate with the PTT client 950, the group media client 960, and the other PTT-aware applications 970 to support services that relate to handovers during PTT and/or full-duplex voice communication sessions. More particularly, in various embodiments, the handover control module 940 that may collect and store statistics that can be consulted to control whether and/or when to trigger a handover during a PTT and/or full-duplex VoIP session according to user behavior during past half-duplex (e.g., PTT) and/or full-duplex VoIP sessions between a "parent" user (i.e., the user who owns or is otherwise associated with a device implementing the group communication platform 900) and various target users. Furthermore, the handover control module 940 may collect and store statistics that relate to average switching delays that occurred during different handover types at different locations, which the handover control module 940 may compare against the user behavior statistics to determine whether and/or when to trigger a handover (if necessary).

Figure 10:
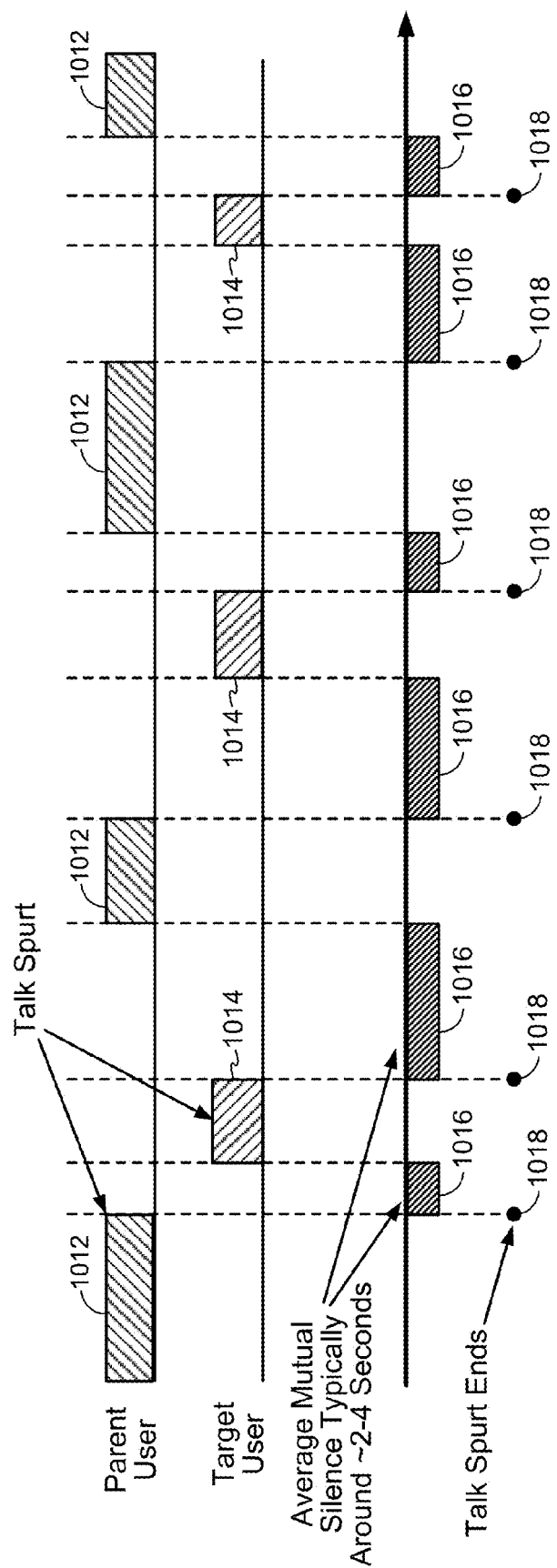
FIG. 10 illustrates an exemplary timing diagram in which mutual silence and/or talk bursts between a parent and target user may provide statistics to determine a handover trigger point during a PTT session, according to one aspect of the disclosure.

For example, according to various embodiments, FIG. 10 illustrates an exemplary timing diagram corresponding to a PTT and/or full-duplex voice communication session between a parent user and a target user, wherein the handover control module 940 may monitor mutual silence and/or talk bursts between the parent user and the target user to collect statistics that can be used to control handover during the voice communication session and/or subsequent voice communication sessions between the parent user and the target user. More particularly, referring to the timing diagram shown in FIG. 10, the handover control module 940 may determine when one or more talk spurts 1012 from the parent user and determine when one or more talk spurts 1014 from the target user end, which may further indicate times when mutual silence periods 1016 start and trigger points 1018 to initiate a handover (if needed). For example, in various embodiments, the handover control module 940 may determine when the parent user talk spurts 1012 and the target user talk spurts 1014 end according to an explicit signaling message (e.g., a Media Burst Control Protocol (MBCP) message as utilized in the Open Mobile Alliance Push to talk over Cellular (OMA POC) architecture). In another example, the handover control module 940 may determine when the parent user talk spurts 1012 and the target user talk spurts 1014 end according to "marker" bits that can be set in Real-Time Transport Protocol (RTP) packets to indicate when the parent user talk spurts 1012 and/or the target user talk spurts 1014 end. In any case, the handover control module 940 may determine an average duration associated with the parent user talk spurts 1012, an average duration associated with the target user talk spurts 1014, and an average duration associated with the mutual silence periods 1016. Furthermore, the handover control module 940 may determine how many times the parent user and the target user took the floor during the voice communication session (four times and three times, respectively, in the example shown in FIG. 10). Accordingly, the handover control module 940 may then update statistics in a user behavior table to track characteristics associated with voice communication sessions between the parent user and the target user. For example, as shown in Table 4, the user behavior table may store statistics based on past PTT and/or full-duplex voice communication sessions between the parent user and each target user in a contact list associated with the parent user that has participated in one or more past voice communication sessions with the parent user, and the average statistics across existing target users may be calculated and used with respect to new target users that have not participated in a past voice communication session with the parent user.

TABLE 4

User Behavior Statistics (PTT and/or Full-Duplex)

| Target User | Average Times Parent User Takes Floor | Average Mutual Silence Duration | Average Times Target User Takes Floor |
|---|---|---|---|
| Alice | 4 | 5 seconds | 6 |
| Jane | 8 | 3 seconds | 3 |
| Jill | 3 | 4 seconds | 3 |
| New Target | 5 = Target Average | 4 = Target Average | 4 = Target Average |

Accordingly, in various embodiments, the handover control module 940 may track and store statistics that relate to how often the parent user (i.e., the user who owns the device that may potentially be subject to a handover) took the floor in PTT sessions with each individual target user and how often the parent user spoke in full-duplex sessions with each individual target user, and may likewise track and store statistics that relate to how often each individual target user took the floor in the PTT sessions with the parent user and how often each individual user spoke in the full-duplex sessions with the parent user. Furthermore, the handover control module 940 may track and store statistics that relate to average durations associated with talk spurts from the parent user, talk spurts from each individual target user, and mutual silence periods during the PTT and full-duplex sessions between the parent user and each individual target user. Accordingly, after each PTT and/or full-duplex session between the parent user and one or more target users ends, the statistics stored in the user behavior table may be updated according to the characteristics associated with that session (e.g., how many times the parent user and the target user took the floor or spoke during the session, average mutual silence durations in between turns speaking, etc.). Furthermore, as noted above, the average statistics across all existing target users may be calculated and used with respect to any new target users that have not previously participated in a PTT and/or full-duplex session with the parent user during the first PTT and/or full-duplex session with the new target users, whereby after the first PTT and/or full-duplex session with the new target users end, new entries may be added to the user behavior table to store statistics relating to the new target users based on behavior during the first session.

Furthermore, in various embodiments, the handover control module 940 may collect and store statistics that relate to average switching delays during different handover types at different locations, which may be compared against the user behavior statistics to determine whether and/or when to trigger a handover if needed. For example, as shown in Table 5 below, the handover control module 940 may maintain statistics that relate to the average delay that occurred when switching from a current radio access technology (RAT) to a target RAT during inter-RAT handovers at particular locations and when switching from a source eNB to a target eNB during intra-RAT handovers, wherein depending on any optimizations that radio access network (RAN) operators may offer, the average switching delays shown in Table 5 may follow a pattern where $D_1 < D_2 < D_3$ and so on. Furthermore, although the switching delays shown in Table 5 do not specifically list handovers to and/or from non-3GPP access networks (e.g., CDMA2000, Wi-Fi, etc.), those skilled in the art will appreciate that such handover types may be readily accounted for and suitably incorporated into the handover statistics used to determine whether and/or when to trigger a handover.

TABLE 5

Handover Statistics (Intra-RAT and/or Inter-RAT)

| Location | Handover Type | Average Switching Delay (ms) |
|---|---|---|
| L1 (x,y,z) | Intra E-UTRAN | $D_1$ |
| | Inter eNB w/X2 | |
| | Inter eNB w/o X2 (S1 handover) | |
| | Inter-RAT to 3G UTRAN | $D_2 > D_1$ |
| | Inter-RAT to GERAN | $D_3 > D_2$ |
| | Inter-RAT from 3G UTRAN to E-UTRAN | $D_4 > D_3$ |
| | Inter-RAT from GERAN to E-UTRAN | $D_5 > D_4$ |
| L2 (x,y,z) | Intra E-UTRAN | $d_1$ |
| | Inter eNB w/X2 | |
| | Inter eNB w/o X2 (S1 handover) | |
| | Inter-RAT to 3G UTRAN | $d_2 > d_1$ |
| | Inter-RAT to GERAN | $d_3 > d_2$ |
| | Inter-RAT from 3G UTRAN to E-UTRAN | $d_4 > d_3$ |
| | Inter-RAT from GERAN to E-UTRAN | $d_5 > d_4$ |

Figure 11:
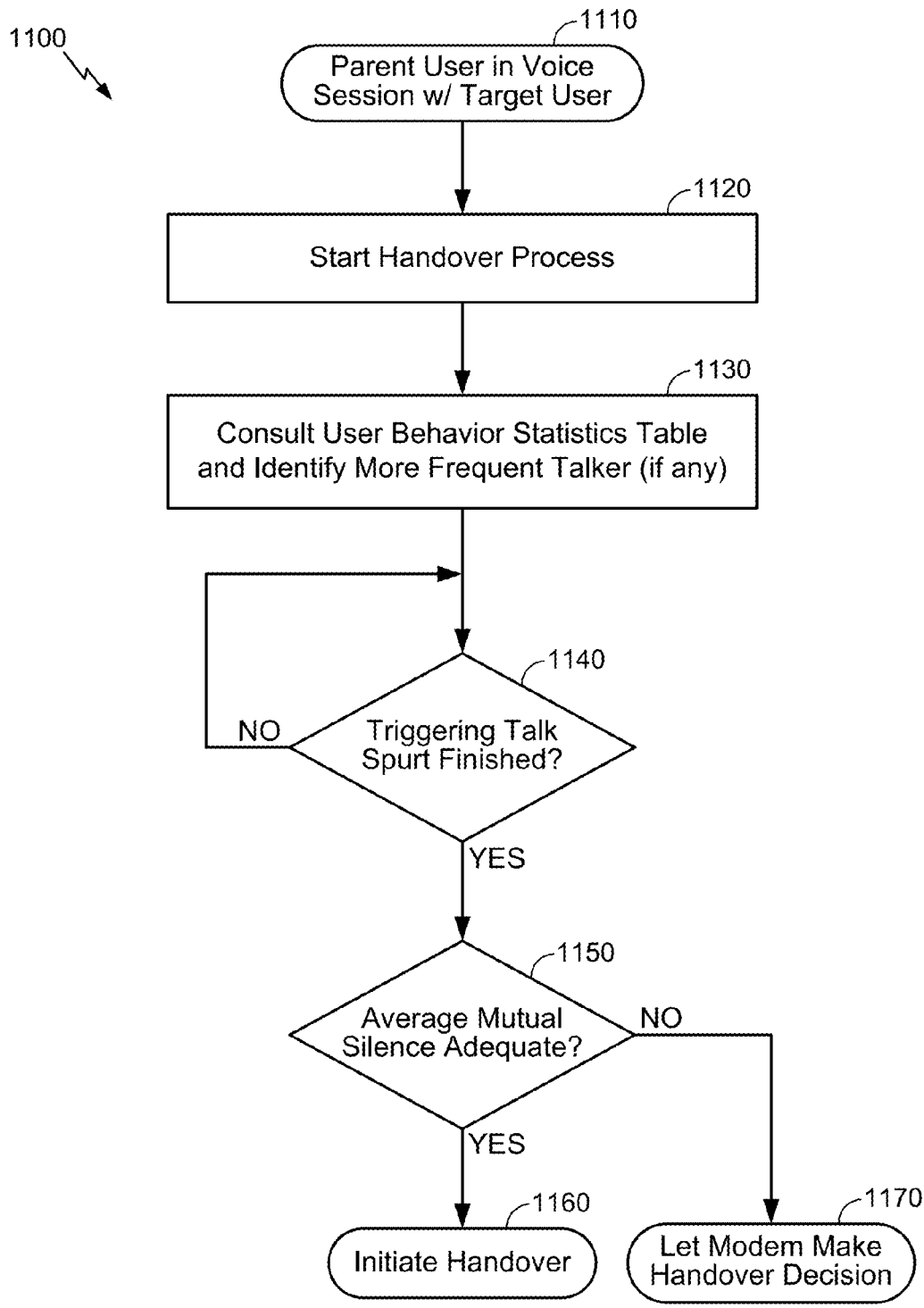
FIG. 11 illustrates an exemplary method in which mutual silence and/or talk burst statistics may be utilized to determine a handover trigger point during a PTT session, according to one aspect of the disclosure.

Accordingly, to determine whether and/or when to trigger a handover, the handover control module 940 may generally consult the statistics in the user behavior table and the handover table to determine a handover trigger point, if needed. For example, according to various embodiments, FIG. 11 illustrates an exemplary method 1100 in which mutual silence and/or talk burst statistics may be utilized to determine a handover trigger point during a PTT session, wherein the method 1100 shown in FIG. 11 may generally be performed using the statistics in the user behavior table and the statistics in the handover table.

In particular, the parent user may be engaged in a PTT and/or full-duplex voice communication session with one or more target users at block 1110, and a handover process may be started at block 1120 due to mobility conditions, radio conditions, cell capacity, more favorable conditions in a neighbor cell, or other suitable conditions. In various embodiments, at block 1130, the statistics in the user behavior table stored on the device associated with the parent user may be consulted at block 1130 to identify a more frequent talker among the parent user and the target users. For example, referring to the example statistics provided above in Table 4, Alice historically takes the floor more often than the parent user, Jane does not take the floor that often compared to the parent user, and Jill takes the floor at approximately the same frequency as the parent user. As such, in a voice communication session with Alice, block 1130 may identify Alice as the more frequent talker, whereby the handover may be triggered after the next talk spurt from Alice finishes. On the other hand, in a voice communication session with Jane, block 1130 may identify the parent user as the more frequent talker, whereby the handover may be triggered after the next talk spurt from the parent user finishes. However, in a voice communication session with Jill, neither the parent user nor Jill may be identified at block 1130 because both users take the floor at approximately the same frequency, whereby the handover may be triggered after the next talk spurt from either the parent user or Jill.

Accordingly, in response to having appropriately identified the more frequent talker among the parent user and the target users involved in the voice communication session, whether the talk spurt from the identified user has finished may be determined at block 1140. After the talk spurt from the identified user finishes, a determination may be made as to whether the average mutual silence between the parent user and the target users can be deemed adequate to support the current handover type. For example, at block 1150, the handover statistics table may be consulted to determine the average switching delay associated with the current handover type based on the current location associated with the device subject to the handover, wherein the average switching delay associated with the current handover type may be compared against the average mutual silence period between the parent user and the target user. For example, referring again to the example statistics provided above in Table 4, the average mutual silence between Alice and the parent user historically lasts about five seconds, which may be adequate to proceed with any handover type, the average mutual silence between Jane and the parent user historically lasts about three seconds, which may be adequate to proceed with intra-RAT handovers, and the average mutual silence between Jill and the parent user historically lasts about four seconds, which may be adequate to proceed with most handover types. As such, in response to determining at block 1150 that the average mutual silence between the parent user and the target user exceeds the average switching delay associated with the current handover type, the average mutual silence may be deemed adequate and the current handover can proceed accordingly at block 1160 after the triggering talk spurt has finished. Otherwise, in the event that the average mutual silence between the parent user and the target user does not exceed the average switching delay associated with the current handover type, the average mutual silence may be inadequate to proceed with the current handover type (e.g., where the current handover is an inter-RAT handover and the target user is Jane). In that case, the device subject to the handover may allow the modem make the handover decision at block 1170 (e.g., based on the conditions that triggered the handover at block 1120).

Figure 12:
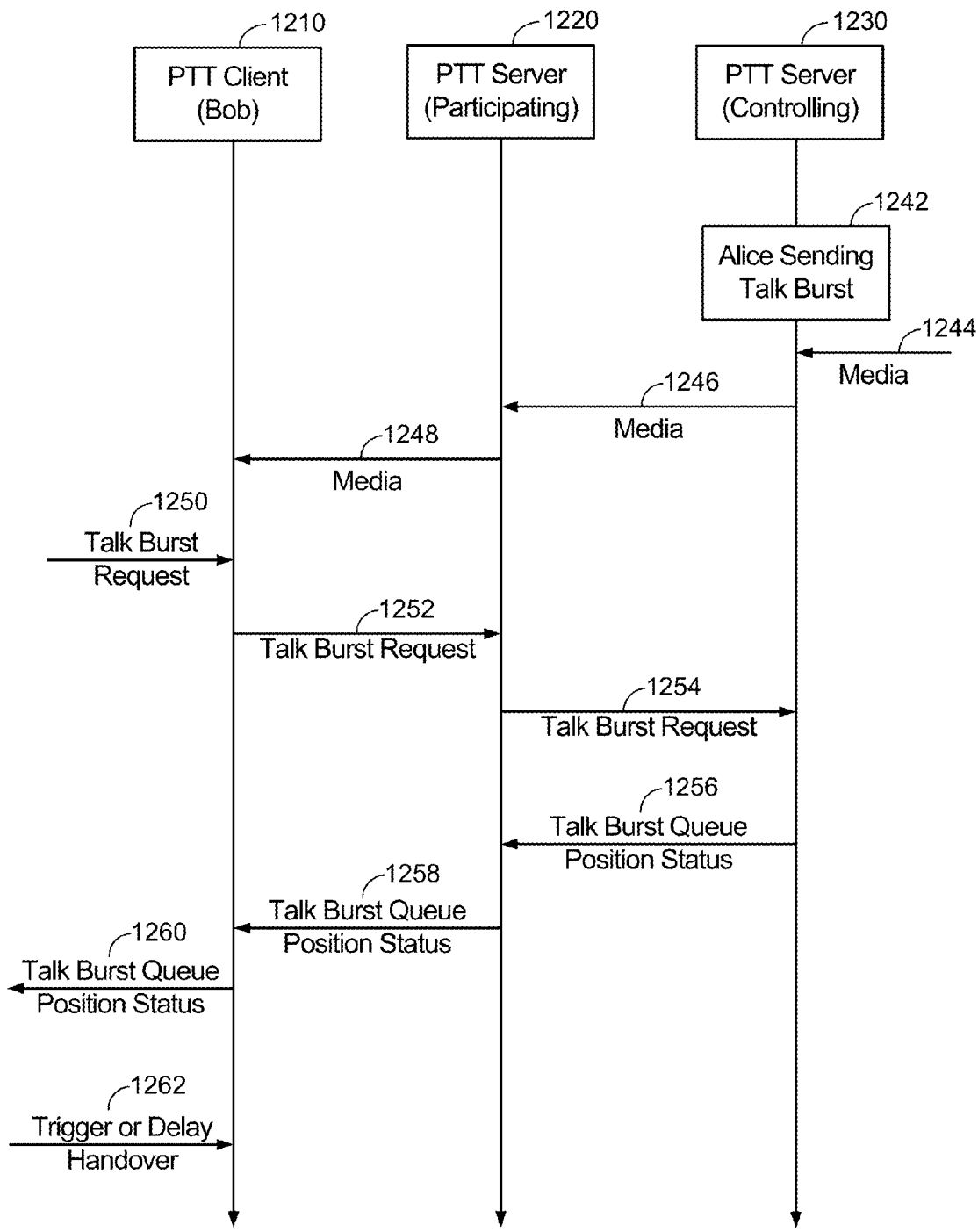
FIG. 12 illustrates an exemplary signaling call flow in which a handover during a PTT session may be triggered or delayed based on a talk burst queue position status, according to one aspect of the disclosure.

According to various embodiments, FIG. 12 illustrates an exemplary signaling call flow in which a handover during a PTT session may be triggered or delayed based on a talk burst queue position status, which may occur in combination with and/or in an alternative to the handover control techniques described above based on the statistics that relate to user behavior and the statistics that relate to handover switching delays. In particular, the signaling flow shown in FIG. 12 may generally support queuing talk burst requests received from participants during a PTT session (e.g., according to the OMA PoC architecture), wherein talk burst requests that are received from one or more PTT clients while another PTT client has permission to send a talk burst may be queued. In that context, the signaling flow shown in FIG. 12 may allow a PTT client 1210 to request a queue position or other status associated with queued talk burst requests from the PTT client 1210 and/or other PTT clients (not shown) from a participating PTT server 1220 and/or a controlling PTT server 1230, which may be configured to mediate the PTT session between the PTT client 1210 and the other PTT clients.

For example, in the signaling call flow shown in FIG. 12, the controlling PTT server 1230 may have granted Alice permission to send a talk burst at 1242, wherein the controlling PTT server 1230 may receive media corresponding to the talk burst from Alice at 1244 and forward the received media to the participating PTT server 1220 at 1246. The participating PTT server 1220 may then relay the media to the PTT client 1210 associated with Bob at 1248. In various embodiments, Bob may press a PTT button or otherwise request permission to send a talk burst at 1250, in response to which the PTT client 1210 associated with Bob may send a talk burst request to the participating PTT server 1220 at 1252, which may relay the talk burst request to the controlling PTT server 1230 at 1254. Furthermore, if Bob has permission to request priority levels other than normal priority, the talk burst request sent at 1250, 1252, and 1254 can include a priority level at which Bob has permission to access.

In various embodiments, the controlling PTT server 1230 may determine that Alice has permission to send a talk burst at the time that the talk burst request is received from the PTT client 1210 associated with Bob. Accordingly, assuming that Bob does not currently have a talk burst request in the queue and has not requested to preempt the talk burst from Alice (or alternatively that Alice has preemptive priority over Bob in the event that the talk burst request sent at 1250, 1252, and 1254 includes a priority level at which Bob has permission to access), the controlling PTT server 1230 may queue the talk burst request from Bob and send a talk burst queue position status message to the PTT client 1210 associated with Bob through the participating PTT server 1220 at 1256, 1258. For example, in various embodiments, the talk burst queue position status message may indicate the current position that the PTT client 1210 holds in the talk burst request queue, and may optionally further indicate the priority level (if any) granted to the talk burst request from the PTT client 1210.

Accordingly, Bob may see the current position that the PTT client 1210 holds in the talk burst request queue at 1260 and determine whether to trigger a handover or delay the handover based thereon. For example, if the talk burst queue position status indicates that Bob's turn to talk will occur soon, Bob may command the PTT client 1210 to delay the handover at 1262. Alternatively, if the talk burst queue position status indicates that Bob has a low position in the queue and will not have a turn to talk for a while, Bob may command the PTT client 1210 to trigger the handover immediately at 1262. In a further example, because Bob can request the position that other participants hold in the talk burst queue, the decision about whether to trigger or delay the handover at 1262 may depend on the position that the other participants hold in the talk burst queue. For example, if an important participant will be talking next or talking soon (e.g., a boss, co-worker, etc.), the command at 1262 may delay the handover, whereas if the next few participants that will be talking are less important, the command sent at 1262 may immediately trigger or otherwise advance the handover.

Figure 13:
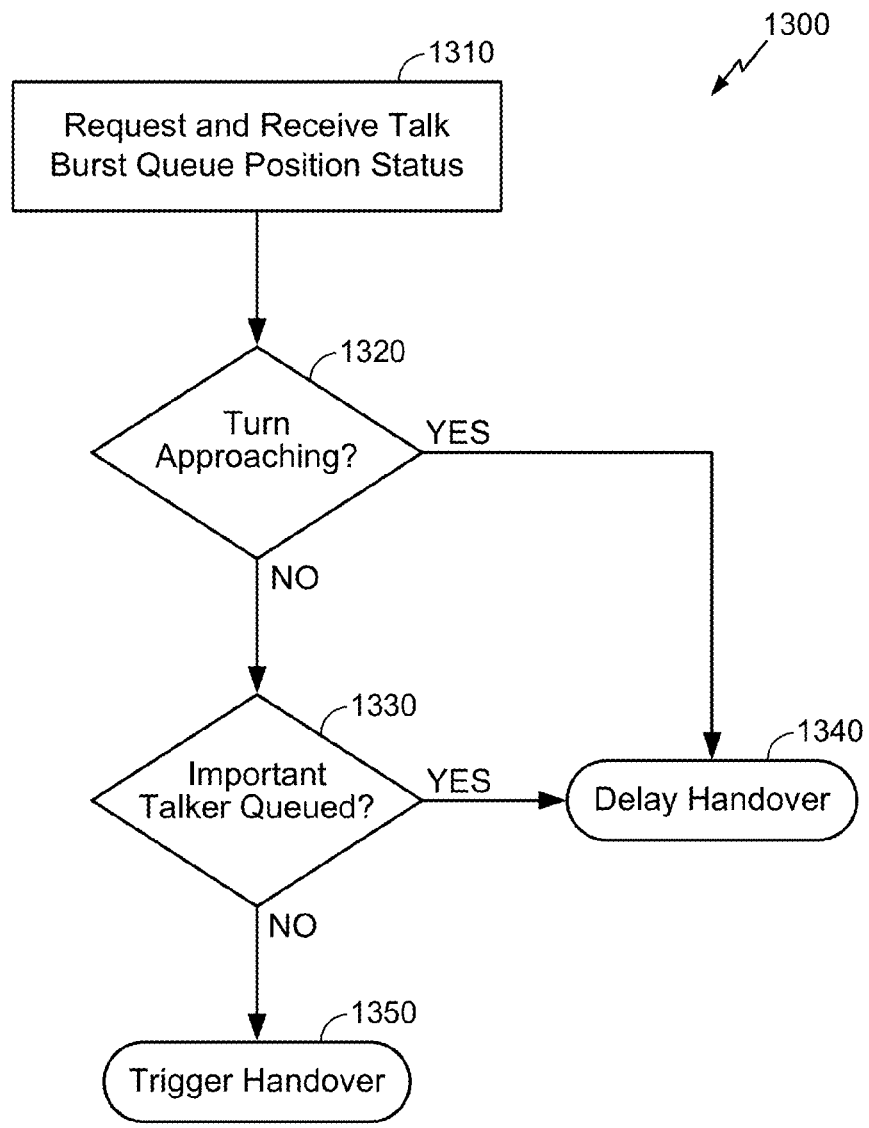
FIG. 13 illustrates an exemplary method in which a handover during a PTT session may be triggered or delayed based on a talk burst queue position status, according to one aspect of the disclosure.

According to various embodiments, FIG. 13 illustrates an exemplary method 1300 in which a handover during a PTT session may be triggered or delayed based on a talk burst queue position status (e.g., according to the signaling call flow shown in FIG. 12). More particularly, the method 1300 may generally be carried out on a wireless device that can operate in an architecture (e.g., OMA PoC) that supports queuing talk burst requests received from participants in a PTT session when another participant in the PTT session has already been granted the floor and/or permission to send a current talk burst.

For example, in various embodiments, a PTT server may grant permission to send a current talk burst to a participant in a PTT session at some point in time prior to a parent participant in the PTT session (e.g., a user associated with the wireless device carrying out the method 1300) requesting permission to send a talk burst at block 1310. Furthermore, in use cases where the parent participant has permission to request a priority level other than normal, the talk burst requested at block 1310 may further include a priority level at which the parent participant has permission to access. In various embodiments, because the PTT server already granted permission to send a current talk burst to the other participant in the PTT session, the PTT server may queue the talk burst requested at block 1310. In a similar respect, in the event that the talk burst requested at block 1310 specified a priority level at which the parent participant has permission to access, the PTT server may queue the requested talk burst if the parent participant did not request to preempt the talk burst from the other participant, or alternatively if the other participant has preemptive priority over the parent participant. In any case, in scenarios where the PTT server queues the requested talk burst, a talk burst queue position status message may be received from the PTT server at block 1310, wherein the talk burst queue position status message may indicate the current position that the parent participant holds in the talk burst request queue, and may optionally further indicate the priority level (if any) granted to the talk burst request from the parent participant.

Accordingly, in various embodiments, the parent participant may learn the current position that the requested talk burst holds in the queue and determine whether to trigger and/or delay a handover based thereon. For example, in response to determining at block 1320 that the talk burst queue position status indicates that the parent participant has an approaching turn to talk, the parent participant may input a command to delay the handover at block 1340. Alternatively, in response to determining at block 1320 that the parent participant has a low position in the queue or otherwise does not have an approaching turn to talk, the parent participant may further determine at block 1330 whether the talk burst queue position status message indicates that an important participant or other participant of interest will be talking next or talking soon (e.g., a boss, co-worker, etc.). Accordingly, if an important participant or other participant of interest will be talking next or talking soon, the parent participant may similarly input a command to delay the handover at block 1340. Otherwise, where the parent participant does not have an approaching turn to talk and the next one or more participants in the queue are not deemed sufficiently important to delay the handover, the parent participant may input a command to immediately trigger or otherwise advance the handover at block 1350.

Figure 14:
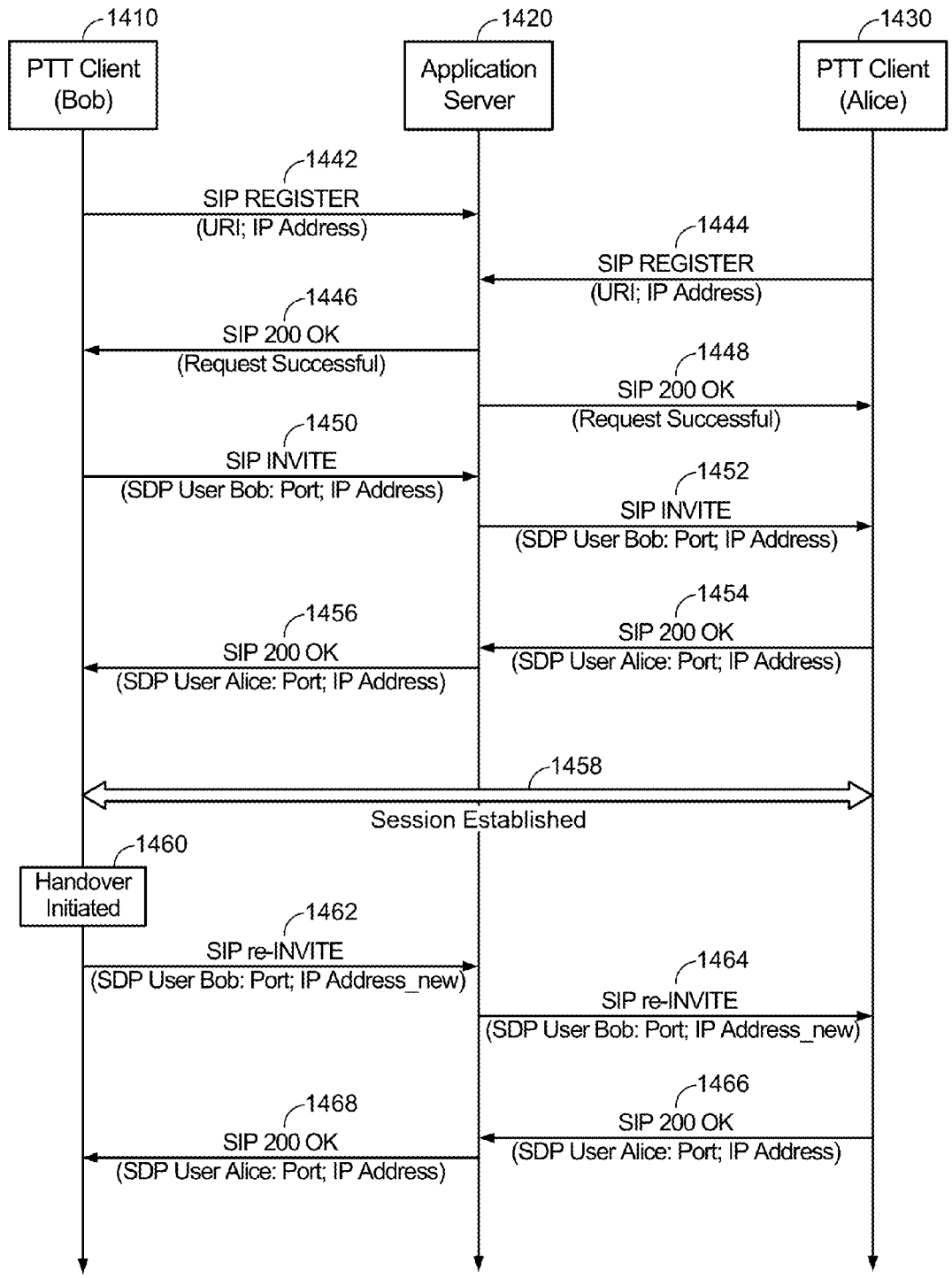
FIG. 14 illustrates an exemplary signaling call flow that may occur in a PTT session prior to, during, and after a handover, according to one aspect of the disclosure.

According to various embodiments, FIG. 14 illustrates an exemplary signaling call flow that may occur in a PTT session prior to, during, and after a handover. More particularly, at 1442 and 1444, a parent PTT client 1410 and a target PTT client 1430 may each transmit a respective Session Initiation Protocol (SIP) REGISTER message to an application server 1420, wherein the SIP REGISTER messages may include a current IP address associated with the parent PTT client 1410 and the target PTT client 1430 and a Uniform Resource Identifier (URI) at which the parent PTT client 1410 and the target PTT client 1430 wish to receive calls. At 1446 and 1448, the application server 1420 may transmit a SIP 200 OK message to the parent PTT client 1410 and the target PTT client 1430 to indicate that the requests sent at 1442 and 1444 succeeded. In various embodiments, at 1450, the parent PTT client 1410 may then send a SIP INVITE message to the application server 1420 to invite the target PTT client 1430 to participate in a PTT call session, wherein the SIP INVITE message may include a Session Description Protocol (SDP) user name associated with the parent PTT client 1410 (e.g., "Bob") in addition to a port number and Internet Protocol (IP) address associated with the parent PTT client 1410. At 1452, the application server 1420 may then relay the SIP INVITE message to the target PTT client 1440, which may return a SIP 200 OK message to the application server 1420 to indicate that the invitation to participate in the PTT call session was accepted at 1454. Accordingly, the SIP 200 OK message sent to the application server 1420 may include an SDP user name (e.g., "Alice"), port number, and IP address associated with the target PTT client 1430. At 1456, the application server 1420 may then relay the SIP 200 OK message to the parent PTT client 1410, whereby the parent PTT client 1410 and the target PTT client 1430 may have sufficient information about one another to establish the PTT call session at 1458.

In various embodiments, at some subsequent point in time, the parent PTT client 1410 may initiate a handover 1460 according to the techniques described in further detail above (e.g., statistics that relate to whether Bob or Alice historically take the floor more often during PTT and/or full-duplex voice sessions with one another, an average mutual silence duration following talk spurts during voice sessions between Bob and Alice, an average switching delay associated with the handover to be initiated at 1460, etc.). In various embodiments, after performing a successful handover to a target radio access technology (RAT) or target eNB, the existing session parameters that were used to establish the session at 1458 need to be updated. Accordingly, at 1462, the parent PTT client 1410 may send a SIP re-INVITE message to the application server 1420 to update the prior contact information associated with the media stream (e.g., a new port and new IP address on the target RAT or target eNB). At 1464, the application server 1420 may relay the SIP re-INVITE message to the target PTT client 1430, which may return a SIP 200 OK message to the application server 1420 at 1466 to indicate that the contact information was successfully updated and to restate the SDP user name, port number, and IP address associated with the target PTT client 1430. At 1468, the application server 1420 may relay the SIP 200 OK message to the parent PTT client 1410, at which time the parent PTT client 1410 and the target PTT client 1430 may have sufficient information to resume the media stream.

Figure 15:
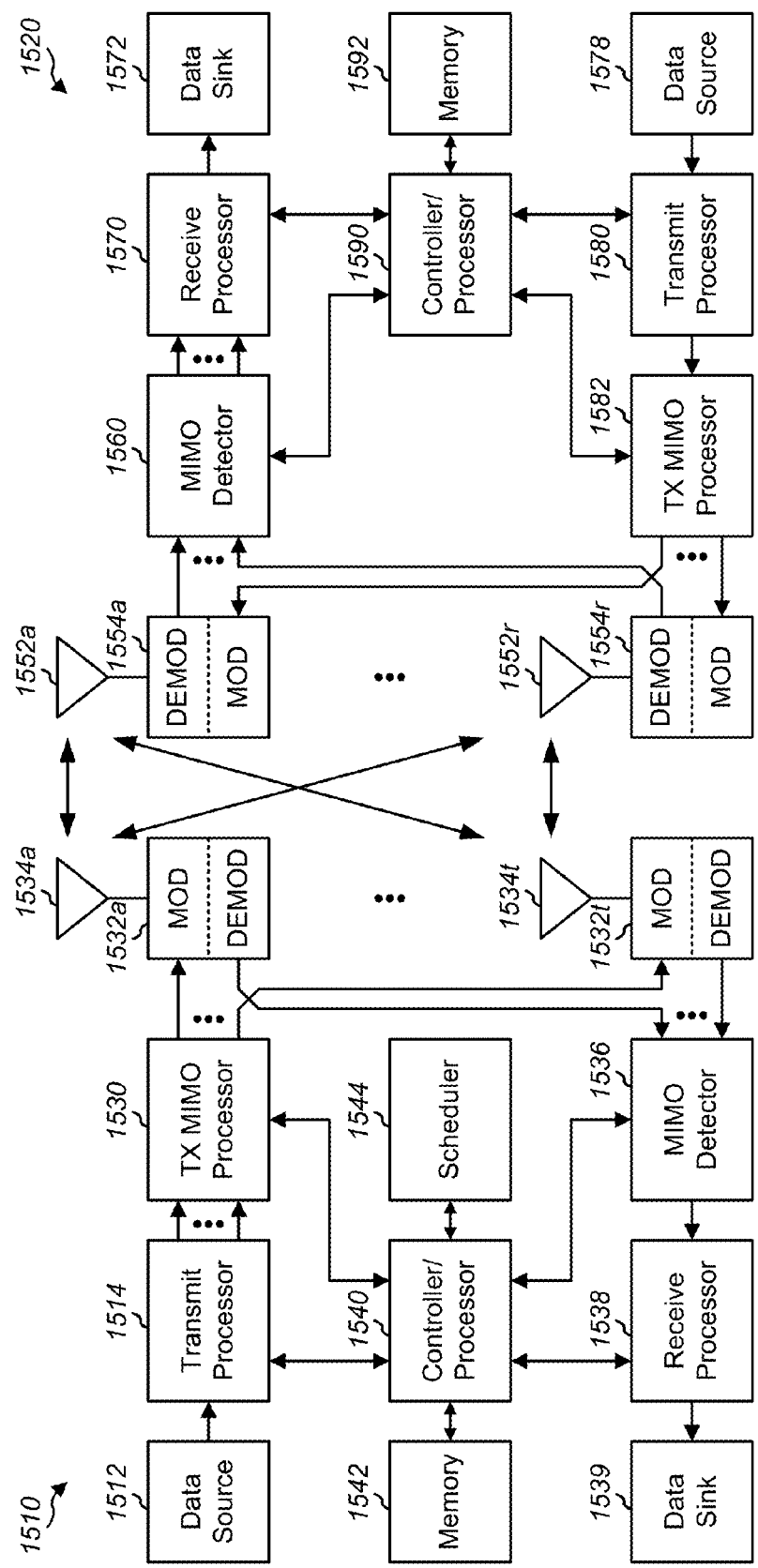
FIG. 15 illustrates an exemplary base station and an exemplary wireless communication device that may communicate with one another during a PTT session, according to one aspect of the disclosure.

According to various embodiments, FIG. 15 illustrates an exemplary base station 1510 and an exemplary wireless communication device 1520, which may be any base station and/or wireless communication device that can communicate with one another during a PTT session in accordance with the various aspects and embodiments disclosed herein. In this design, base station 1510 is equipped with T antennas 1534a through 1534t, and wireless communication device 1520 is equipped with R antennas 1552a through 1552r, where T and R are generally greater than or equal to one.

At base station 1510, a transmit processor 1514 may receive data for unicast services and data for broadcast and/or multicast services from a data source 1512 (e.g., directly or indirectly from an application server). Transmit processor 1514 may process the data for each service to obtain data symbols. Transmit processor 1514 may also receive scheduling information, configuration information, control information, system information and/or other overhead information from a controller/processor 1540 and/or a scheduler 1544. Transmit processor 1514 may process the received overhead information and provide overhead symbols. A transmit (TX) multiple-input multiple-output (MIMO) processor 1530 may multiplex the data and overhead symbols with pilot symbols, process (e.g., precode) the multiplexed symbols, and provide T output symbol streams to T modulators (MOD) 1532a through 1532t. Each modulator 1532 may process a respective output symbol stream (e.g., for OFDM) to obtain an output sample stream. Each modulator 1532 may further process (e.g., convert to analog, amplify, filter, and upconvert) the output sample stream to obtain a downlink signal. T downlink signals from modulators 1532a through 1532t may be transmitted via T antennas 1534a through 1534t, respectively.

At wireless communication device 1520, antennas 1552a through 1552r may receive the downlink signals from base station 1510 and provide received signals to demodulators (DEMOD) 1554a through 1554r, respectively. Each demodulator 1554 may condition (e.g., filter, amplify, downconvert, and digitize) a respective received signal to obtain received samples and may further process the received samples (e.g., for OFDM) to obtain received symbols. A MIMO detector 1560 may receive and process the received symbols from all R demodulators 1554a through 1554r and provide detected symbols. A receive processor 1570 may process the detected symbols, provide decoded data for wireless communication device 1520 and/or desired services to a data sink 1572, and provide decoded overhead information to a controller/processor 1590. In general, the processing by MIMO detector 1560 and receive processor 1570 is complementary to the processing by TX MIMO processor 1530 and transmit processor 1514 at base station 1510.

On the uplink, at wireless communication device 1520, data from a data source 1578 and overhead information from a controller/processor 1590 may be processed by a transmit processor 1580, further processed by a TX MIMO processor 1582 (if applicable), conditioned by modulators 1554a through 1554r, and transmitted via antennas 1552a through 1552r. At base station 1510, the uplink signals from wireless communication device 1520 may be received by antennas 1534, conditioned by demodulators 1532, detected by a MIMO detector 1536, and processed by a receive processor 1538 to obtain the data and overhead information transmitted by wireless communication device 1520.

Controllers/processors 1540 and 1590 may direct the operation at base station 1510 and wireless communication device 1520, respectively. Scheduler 1544 may schedule wireless communication devices for downlink and/or uplink transmission, schedule transmission of broadcast and multicast services, and provide assignments of radio resources for the scheduled wireless communication devices and services. Controller/processor 1540 and/or scheduler 1544 may generate scheduling information and/or other overhead information for the broadcast and multicast services.

Controller/processor 1590 may implement processes for the techniques described herein. Memories 1542 and 1592 may store data and program codes for base station 1510 and wireless communication device 1520, respectively. Accordingly, group communications can be accomplished in accordance with the various embodiments disclosed herein, while still remaining compliant with the existing standards.

Figure 16:
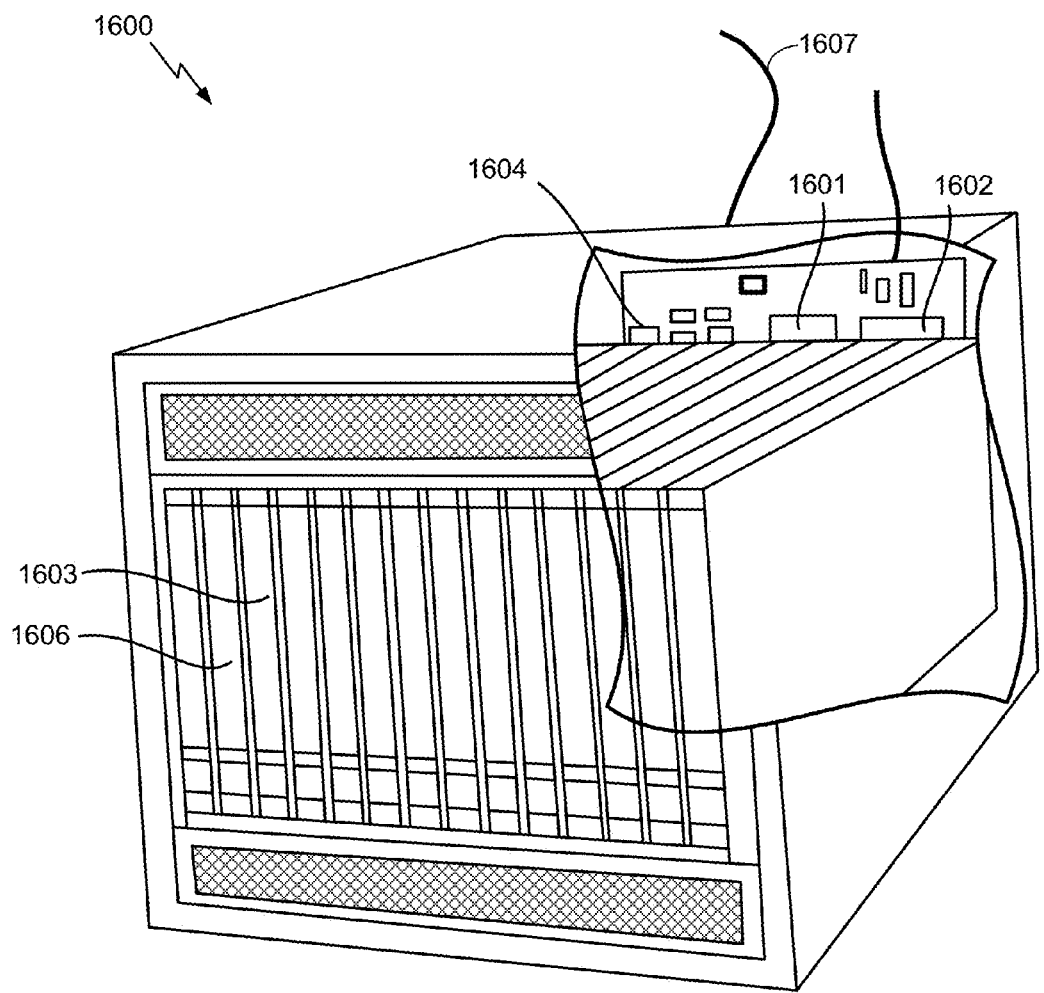
FIG. 16 illustrates an exemplary server (e.g., a group communication server) that may control communications among various wireless telecommunication devices in a PTT group, according to one aspect of the disclosure.

According to various embodiments, FIG. 16 illustrates an exemplary server 1600 (e.g., a group communication server) that may control communications among various wireless telecommunication devices in a PTT group. In one example, the server 1600 may be one exemplary configuration corresponding to the MSC, the DCH, the MCU, and/or any other network entity described above. As shown in FIG. 16, the server 1600 may include a processor 1601 coupled to volatile memory 1602 and a large capacity nonvolatile memory (e.g., a disk drive 1603). The server 1600 may also include a floppy disc drive, compact disc (CD) or DVD disc drive 1606 coupled to the processor 1601. The server 1600 may also include network access ports 1604 coupled to the processor 1601 for establishing data connections with a network 1607, such as a local area network coupled to other broadcast system computers and servers or to the Internet. Furthermore, in context with FIG. 5 and/or FIG. 15, those skilled in the art will appreciate that the server 1600 shown in FIG. 16 may correspond to one exemplary implementation of the wireless communication devices 500A, 500B, and/or 1520 shown in FIG. 5 and/or FIG. 15, which may transmit and/or receive information using components that may correspond to the network access points 1604 used by the server 1600 to communicate with the network 1607, process information using components that may correspond to the processor 1601, and store information using components that may correspond to any combination of the volatile memory 1602, the disk drive 1603 and/or the disc drive 1606. Accordingly, FIG. 16 generally helps to demonstrate that the wireless communication devices 500A and 500B shown in FIG. 5 and/or the wireless communication device 1520 shown in FIG. 15 may have a server implementation as shown in FIG. 16 and/or a wireless communication device implementation as shown in FIG. 5 and FIG. 15.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, actions, and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for optimizing handover during voice sessions, comprising:

detecting a condition triggering a handover at a wireless device associated with a parent user during a current voice communication session between the parent user and a target user, wherein the handover has a type associated with a switching delay;

storing one or more statistics that relate to the switching delay associated with the handover type and switching delays associated with one or more additional handover types, wherein handover types in which the wireless device switches from a current radio access technology (RAT) to a target RAT have greater switching delays than intra-RAT handover types;

determining an average mutual silence duration after talk spurts from the parent user and the target user based on one or more past voice communication sessions in which at least the parent user participated; and triggering the handover when a next talk spurt from either the parent user or the target user ends in response to the determined average mutual silence duration exceeding the switching delay associated with the handover type.

2. The method recited in claim 1, wherein the target user further participated in the one or more past voice communication sessions used to determine the average mutual silence duration.

3. The method recited in claim 2, wherein triggering the handover comprises:

determining whether the parent user or the target user spoke more often in the one or more past voice communication sessions; and triggering the handover after the next talk spurt from the target user in response to determining that the target user spoke more often in the one or more past voice communication sessions.

4. The method recited in claim 2, further comprising:

determining that the current voice communication session has ended; and updating one or more statistics that indicate the average mutual silence duration after the talk spurts from the parent user and the target user and that further indicate how often the parent user and the target user speak in voice communication sessions with one another based on the ended current voice communication session.

5. The method recited in claim 2, wherein the handover is triggered after the next talk spurt from either user in response to determining that the parent user and the target user spoke at approximately the same frequency in the one or more past voice communication sessions.

6. The method recited in claim 2, wherein triggering the handover comprises:

determining whether the parent user or the target user spoke more often in the one or more past voice communication sessions; and triggering the handover after the next talk spurt from the parent user in response to determining that the parent user spoke more often in the one or more past voice communication sessions.

7. The method recited in claim 1, further comprising:

determining that the triggered handover succeeded; and updating the one or more statistics that relate to the switching delay associated with the handover type according to a switching delay associated with the successfully triggered handover.

8. The method recited in claim 1, wherein determining the average mutual silence duration comprises:

calculating average mutual silence durations after talk spurts from the parent user and one or more other target users that participated in the one or more past voice communication sessions with the parent user in response to the parent user not having any past voice communication sessions with the target user.

9. The method recited in claim 1, further comprising:

allowing a modem on the wireless device to make a decision about when to trigger the handover in response to determining that the average mutual silence duration does not exceed the switching delay associated with the handover type.

10. The method recited in claim 1, wherein the current voice communication session and the one or more past voice communication sessions comprise one or more of push-to-talk (PTT) or full-duplex Voice over Internet Protocol (VoIP) sessions.

11. A method for optimizing handover during voice sessions, comprising:

detecting a condition triggering a handover at a wireless device associated with a parent user during a current voice communication session between the parent user and a target user, wherein the handover has a type associated with a switching delay;

determining an average mutual silence duration after talk spurts from the parent user and the target user based on one or more past voice communication sessions in which at least the parent user participated;

triggering the handover when a next talk spurt from either the parent user or the target user ends in response to the determined average mutual silence duration exceeding the switching delay associated with the handover type;

sending, by the wireless device, a talk burst request to a server configured to mediate the current voice communication session between the parent user and the target user;

receiving, at the wireless device, a talk burst queue position status message from the server, wherein the received talk burst queue position status message indicates that the target user has permission to send a current talk burst and further indicates a position that the talk burst request from the parent user holds in a talk burst queue; and receiving, at the wireless device, a command to advance or delay the triggered handover based on the talk burst queue position status message.

12. The method recited in claim 11, wherein the received talk burst queue position status message further indicates positions that talk burst requests from other target users participating in the current voice communication session hold in the talk burst queue.

13. A wireless device, comprising:

a storage device configured to store statistics that are at least associated with one or more past voice communication sessions in which at least a parent user associated with the wireless device participated; and one or more processors configured to:

detect a condition triggering a handover during a current voice communication session between the parent user and a target user, wherein the handover has a type and the statistics stored in the storage device further relate to a switching delay associated with the handover type and switching delays associated with one or more additional handover types, and wherein handover types in which the wireless device switches from a current radio access technology (RAT) to a target RAT have greater switching delays than intra-RAT handover types;

determine, from the stored statistics, an average mutual silence duration after talk spurts from the parent user and the target user based on one or more past voice communication sessions in which at least the parent user participated; and trigger the handover when a next talk spurt from either the parent user or the target user ends in response to the determined average mutual silence duration exceeding the switching delay associated with the handover type.

14. The wireless device recited in claim 13, wherein the target user further participated in the one or more past voice communication sessions used to determine the average mutual silence duration.

15. The wireless device recited in claim 14, wherein the one or more processors are further configured to trigger the handover after the next talk spurt from the parent user in response to the stored statistics indicating that the parent user spoke more often in the one or more past voice communication sessions.

16. The wireless device recited in claim 14, wherein the one or more processors are further configured to trigger the handover after the next talk spurt from the target user in response to the stored statistics indicating that the target user spoke more often in the one or more past voice communication sessions.

17. The wireless device recited in claim 14, wherein the one or more processors are further configured to trigger the handover after the next talk spurt from either user in response to the stored statistics indicating that the parent user and the target user spoke at approximately the same frequency in the one or more past voice communication sessions.

18. The wireless device recited in claim 13, wherein the one or more processors are further configured to update the statistics that relate to the switching delay associated with the handover type according to a switching delay associated with the triggered handover.

19. A wireless device comprising:
a storage device configured to store statistics associated with one or more past voice communication sessions in which at least a parent user associated with the wireless device participated;
a transmitter configured to send a talk burst request to a server configured to mediate a current voice communication session between the parent user and a target user;
a receiver configured to receive a talk burst queue position status message from the server, wherein the received talk burst queue position status message indicates that the target user has permission to send a current talk burst and further indicates a position that the talk burst request from the parent user holds in a talk burst queue; and
one or more processors configured to:
  detect a condition triggering a handover during the current voice communication session between the parent user and the target user, wherein the handover has a type associated with a switching delay;
  determine, from the stored statistics, an average mutual silence duration after talk spurts from the parent user and the target user based on one or more past voice communication sessions in which at least the parent user participated;
  trigger the handover when a next talk spurt from either the parent user or the target user ends in response to the determined average mutual silence duration exceeding the switching delay associated with the handover type; and
  receive a command to advance or delay the triggered handover based on the talk burst queue position status message.

20. The wireless device recited in claim 19, wherein the received talk burst queue position status message further indicates positions that talk burst requests from other target users participating in the current voice communication session hold in the talk burst queue.

21. A non-transitory computer-readable storage medium having computer-executable instructions recorded thereon, wherein executing the computer-executable instructions on a wireless device causes the wireless device to:
detect a condition triggering a handover during a current voice communication session between a parent user associated with the wireless device and a target user, wherein the handover has a type associated with a switching delay;
store one or more statistics that relate to the switching delay associated with the handover type and switching delays associated with one or more additional handover types, wherein handover types in which the wireless device switches from a current radio access technology (RAT) to a target RAT have greater switching delays than intra-RAT handover types;
determine an average mutual silence duration after talk spurts from the parent user and the target user based on one or more past voice communication sessions in which at least the parent user participated; and
trigger the handover when a next talk spurt from either the parent user or the target user ends in response to the determined average mutual silence duration exceeding the switching delay associated with the handover type.

22. A non-transitory computer-readable storage medium having computer-executable instructions recorded thereon, wherein executing the computer-executable instructions on a wireless device causes the wireless device to:
detect a condition triggering a handover during a current voice communication session between a parent user associated with the wireless device and a target user, wherein the handover has a type associated with a switching delay;
determine an average mutual silence duration after talk spurts from the parent user and the target user based on one or more past voice communication sessions in which at least the parent user participated;
trigger the handover when a next talk spurt from either the parent user or the target user ends in response to the determined average mutual silence duration exceeding the switching delay associated with the handover type;
send a talk burst request to a server configured to mediate the current voice communication session between the parent user and the target user;
receive a talk burst queue position status message from the server, wherein the received talk burst queue position status message indicates that the target user has permission to send a current talk burst and further indicates a position that the talk burst request from the parent user holds in a talk burst queue; and
receive a command to advance or delay the triggered handover based on the talk burst queue position status message.

* * * * *